US012739016B2

(12) United States Patent
Wakabayashi et al.

(10) Patent No.: US 12,739,016 B2
(45) Date of Patent: Sep. 15, 2026

(54) METHODS, COMMUNICATIONS DEVICES AND INFRASTRUCTURE EQUIPMENT

(71) Applicant: Sony Group Corporation, Tokyo (JP)

(72) Inventors: Hideji Wakabayashi, Basingstoke (GB); Yassin Aden Awad, Basingstoke (GB); Vivek Sharma, Basingstoke (GB); Yuxin Wei, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 54 days.

(21) Appl. No.: 18/846,297

(22) PCT Filed: Mar. 3, 2023

(86) PCT No.: PCT/EP2023/055489

§ 371 (c)(1),
(2) Date: Sep. 12, 2024

(87) PCT Pub. No.: WO2023/180044

PCT Pub. Date: Sep. 28, 2023

(65) Prior Publication Data

US 2025/0192867 A1 Jun. 12, 2025

(30) Foreign Application Priority Data

Mar. 23, 2022 (EP) .................................... 22163946

(51) Int. Cl.
*H04L 23/02* (2006.01)
*H04B 7/06* (2006.01)
(Continued)

(52) U.S. Cl.
CPC ..... *H04B 7/06966* (2023.05); *H04B 7/06964* (2023.05); *H04W 72/046* (2013.01); *H04W 72/542* (2023.01)

(58) Field of Classification Search
CPC .... H04B 7/088; H04B 7/0695; H04B 7/0404; H04B 7/0617; H04W 72/046;
(Continued)

(56) References Cited

U.S. PATENT DOCUMENTS

2019/0075524 A1 3/2019 Zhou et al.
2020/0136895 A1 4/2020 Venugopal et al.
(Continued)

FOREIGN PATENT DOCUMENTS

EP 2745612 B1 3/2021

OTHER PUBLICATIONS

3GPP, "Technical Specification Group Radio Access Network; NR; User Equipment (UE) radio transmission and reception; Part 1: Range 1 Standalone (Release 16)", 3GPP TS 38.101-1 V16.4.0, Jun. 2020, pp. 1-406.

(Continued)

*Primary Examiner* — Khai Tran
(74) *Attorney, Agent, or Firm* — XSENSUS LLP

(57) ABSTRACT

A method of operating a communications device for transmitting signals to and/or receiving signals from infrastructure equipment of a wireless communications network is provided. The method comprises receiving, from the infrastructure equipment on a first carrier for the communications device, an indication of uplink resources for transmitting a plurality of directional uplink beams to the infrastructure equipment on an second carrier for the communications device. The second carrier is an uplink-only carrier. The method comprises transmitting the plurality of directional uplink beams to the infrastructure equipment on the second carrier in accordance with the uplink resources indicated by the infrastructure equipment. The method comprises receiving, from the infrastructure equipment on the first carrier, an indication of a result of measurements performed on the (Continued)

plurality of directional uplink beams transmitted on the second carrier.

20 Claims, 12 Drawing Sheets

(51) Int. Cl.
*H04W 72/044* (2023.01)
*H04W 72/542* (2023.01)

(58) Field of Classification Search
CPC ............. H04W 72/0453; H04W 72/02; H04W 72/044; H04W 72/1268; H04L 5/0055; H04L 5/0224; H04L 5/001
USPC ................................. 375/262, 260, 267, 299
See application file for complete search history.

(56) References Cited

U.S. PATENT DOCUMENTS

2021/0153253 A1* 5/2021 Wang .................... H04W 72/02
2021/0185571 A1* 6/2021 Ly ..................... H04W 36/0069
2022/0225360 A1* 7/2022 Yi ......................... H04W 72/21
2023/0344603 A1* 10/2023 Zhou .................. H04B 7/06952

OTHER PUBLICATIONS

3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.13.0, Mar. 2021, pp. 1-241.
3GPP, "Technical Specification Group Radio Access Network; NR; User Equipment (UE) radio transmission and reception; Part 2: Range 2 Standalone (Release 15)", 3GPP TS 38.101-2, V15.7.0, Sep. 2019, pp. 1-144.
3GPP, "Technical Specification Group Radio Access Network; NR; NR and NG-RAN Overall Description; Stage 2 (Release 15)", 3GPP TS 38.300 V15.12.0, Mar. 2021, pp. 1-102.
3GPP, "Technical Specification Group Radio Access Network; NR; Medium Access Control (MAC) protocol specification (Release 15)", 3GPP TS 38.321 V15.12.0, Mar. 2021, pp. 1-79.
3GPP, "Technical Specification Group Radio Access Network; NR; Radio Resource Control (RRC) protocol specification (Release 15)", 3GPP TS 38.331 V15.13.0, Mar. 2021, pp. 1-540.
NTT Docomo, Inc., "New WID on NR UL Enhancements", 3GPP TSG RAN Meeting #94e, RP-212702, Dec. 6-17, 2021, Agenda Item: 8A.1, 5 pages.
Holma et al., "LTE for UMTS OFDMA and SC-FDMA based radio access", John Wiley and Sons Ltd, 2009, 232 pages.
International Search Report and Written Opinion mailed on Apr. 14, 2023, received for International Application No. PCT/EP2023/055489, filed on Mar. 3, 2023, 09 pages including English Translation.

* cited by examiner

METHODS, COMMUNICATIONS DEVICES AND INFRASTRUCTURE EQUIPMENT

CROSS-REFERENCE TO RELATED APPLICATIONS

The present application is a national stage application, pursuant to 35 U.S.C. § 371, of International Patent Application No. PCT/EP2023/055489, filed Mar. 3, 2023, which claims the Paris Convention priority of European Patent Application No. 22163946.1, filed Mar. 23, 2022, the contents of each are hereby incorporated herein by reference.

BACKGROUND

Field of Disclosure

The present disclosure relates to methods, communications devices and infrastructure equipment for efficiently providing improved uplink coverage in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Previous generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Current and future wireless communications networks are expected to routinely and efficiently support communications with an ever-increasing range of devices associated with a wider range of data traffic profiles and types than existing systems are optimised to support. For example, it is expected future wireless communications networks will be expected to efficiently support communications with devices including reduced complexity devices, machine type communication (MTC) devices, high resolution video displays, virtual reality headsets, extended Reality (XR) and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for current future wireless communications networks, for example those which may be referred to as 5G or new radio (NR) systems/new radio access technology (RAT) systems or indeed future 6G wireless communications, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems, as well as future generation communications systems.

The increasing use of different types of network infrastructure equipment, such as base stations and relay nodes/repeater devices, and terminal devices associated with different traffic profiles, as well as the consideration of deployment strategies for such network infrastructure equipment in various and varying environments, together give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device for transmitting signals to and/or receiving signals from infrastructure equipment of a wireless communications network. The method comprises receiving, from the infrastructure equipment on a first carrier for the communications device, an indication of uplink resources for transmitting a plurality of directional uplink beams to the infrastructure equipment on an second carrier for the communications device. The second carrier is an uplink-only carrier. The method comprises transmitting the plurality of directional uplink beams to the infrastructure equipment on the second carrier in accordance with the uplink resources indicated by the infrastructure equipment. The method comprises receiving, from the infrastructure equipment on the first carrier, an indication of a result of measurements performed on the plurality of directional uplink beams transmitted on the second carrier.

Embodiments can also provide a method of operating infrastructure equipment of a wireless communications network for transmitting signals to and/or receiving signals from a communications device. The method comprises transmitting, to the communications device on a first carrier for the communications device, an indication of uplink resources for transmitting a plurality of directional uplink beams to the infrastructure equipment on an second carrier for the communications device. The second carrier is an uplink-only carrier. The method comprises receiving the plurality of directional uplink beams from the communications device on the second carrier in accordance with the uplink resources indicated by the infrastructure equipment. The method comprises performing one or more measurements on the plurality of directional uplink beams. The method comprises transmitting, to the communications device on the first carrier, an indication of a result of measurements performed on the plurality of directional uplink beams transmitted on the second carrier.

Embodiments can provide methods, communications devices and infrastructure equipment with can efficiently provide improved uplink coverage in a wireless communications network. For example, embodiments can reduce a required communications device transmission power and reduce uplink interference between different communications devices in dense deployment scenarios.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
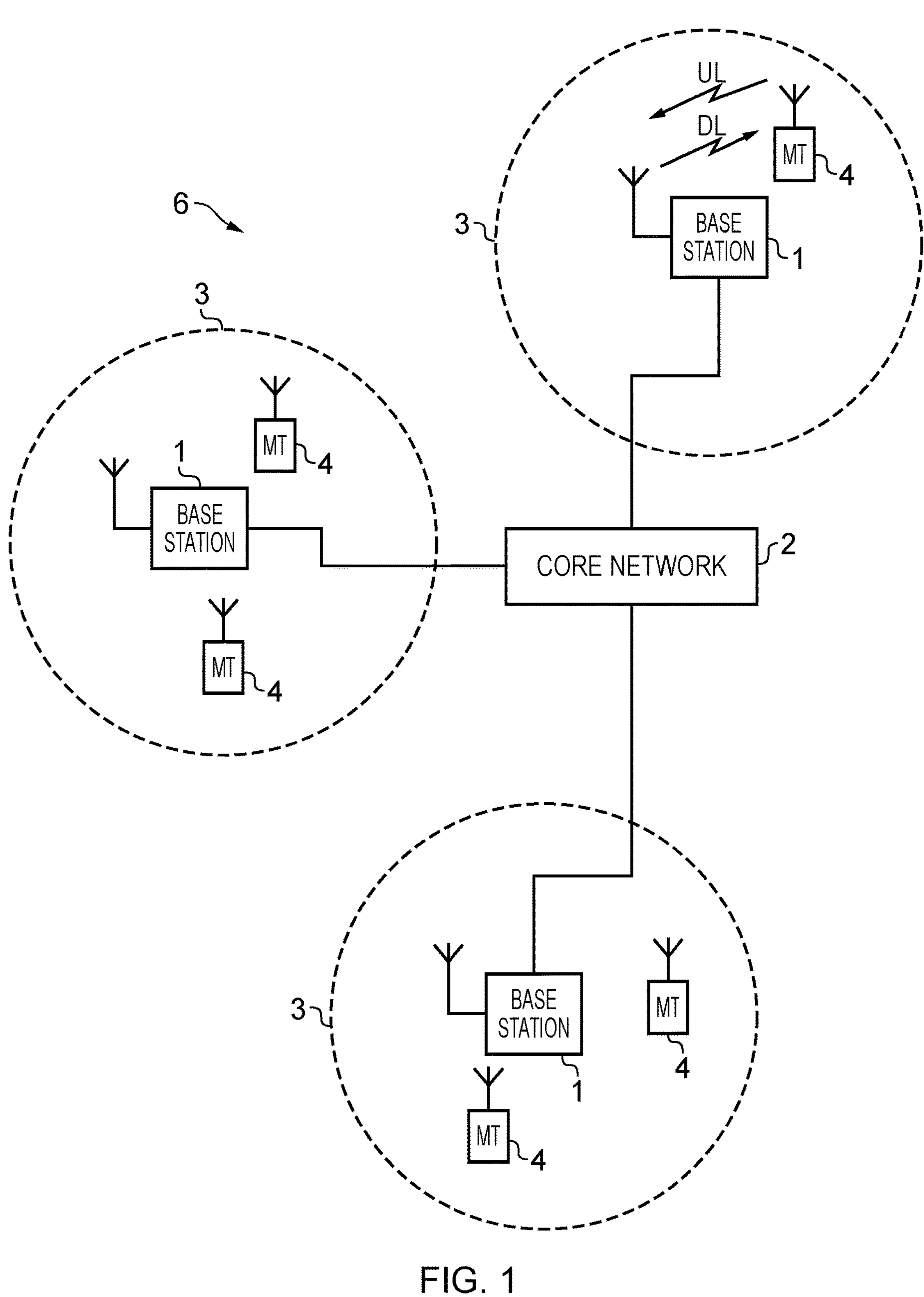
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP ® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (alternatively referred to as a “cell”) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. The communications devices 4 may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
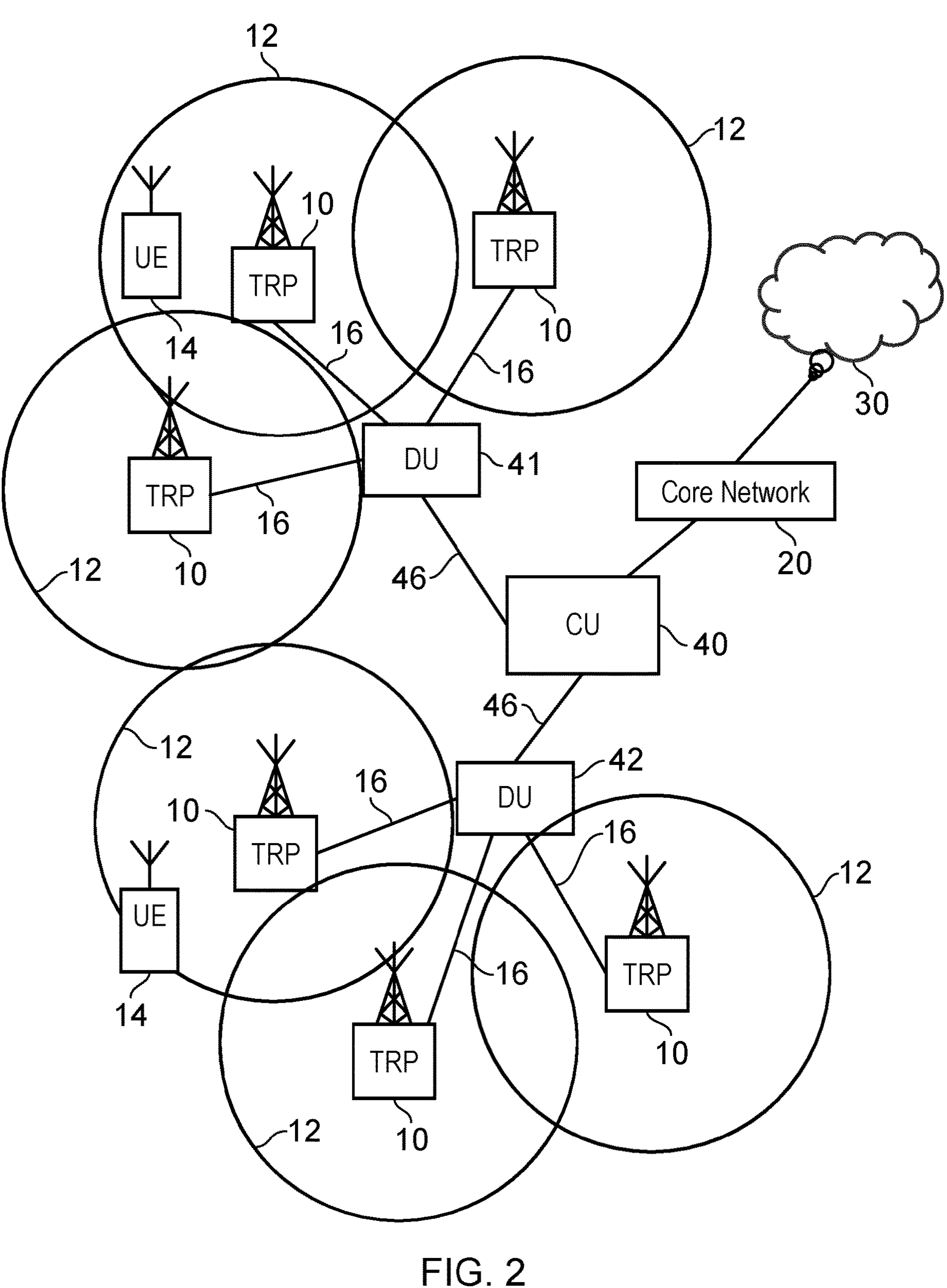
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices 14 and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the communications devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices 14 may lie with the controlling node/central unit and/or the distributed units/TRPs. As shown in FIG. 2, each TRP is surrounded by a coverage area 12 (or "cell") within which a communications device 14 may exchange signalling with the central unit 40 via one of the distributed units/TRPs 10 associated with the coverage area 12. Each coverage area 12 may be generated or provided by the TRP 10 associated with that coverage area 12. Each TRP 10 may provide or generate its associated coverage area 12 under the control of the DU 42 and/or CU 40. Alternatively stated, each coverage area 12 may be provided by infrastructure equipment of the wireless communications network.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
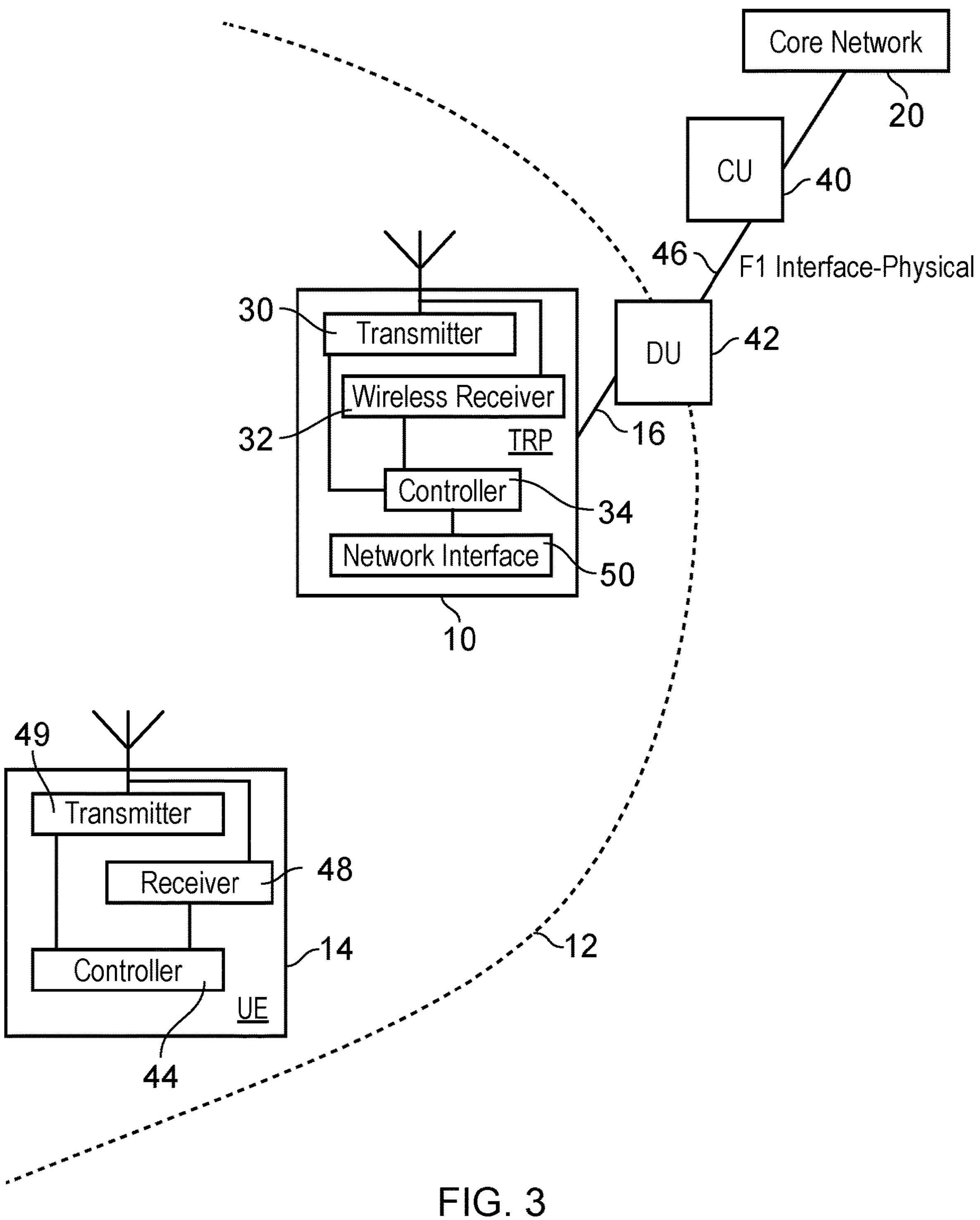
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more communications devices 14 within the coverage area 12 formed by the TRP 10. As shown in FIG. 3, an example communications device 14 (such as a UE) is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Asymmetric Uplink and Downlink Coverage

As mentioned above, infrastructure equipment of a wireless communications network can provide a coverage area within which communications can exchange signalling with the infrastructure equipment. In the case of an LTE network 6, such as that shown in FIG. 1, each coverage area 3 is provided by the base station 1 and is provided for the communications devices 4 to exchange signalling with each respective base station 1. In the case of an NR wireless communications network, such as that shown in FIG. 2, each coverage area is provided 12 by the TRP 10 under the control of the DU 42 and/or the CU 40 and is provided for the communications devices 14 to exchange signalling with the TRP 10, DU 42 and/or CU 40.

In more detail, the coverage areas 3, 12 shown in FIGS. 1 and 2 represent "symmetric coverage areas". As will be appreciated by one skilled in the art, a symmetric coverage area is an area within which a communications device can perform uplink transmissions or receive downlink transmissions from infrastructure equipment of a wireless communications network. However, in real deployments, an area within which a communications device can perform uplink transmissions with infrastructure equipment may be different to an area within which the communications device can receive downlink transmissions from the infrastructure equipment.

In other words, infrastructure equipment can provide a coverage area for downlink transmissions with one or more communications devices (hereinafter referred to as a "downlink coverage area") and a coverage area for uplink transmissions with the one or more communications devices (hereinafter referred to as a "uplink coverage area"), where the downlink coverage area and the uplink coverage area do not cover the exact same geographical area. For example, the downlink area may be larger than, and encompass, the uplink coverage area. The extent of the downlink coverage area may be determined at least partly by a transmission power of the infrastructure equipment providing the coverage area. In one example, the higher the transmission power of the infrastructure equipment, the larger the downlink coverage area within which downlink communications can be received by a communications device. On the other hand, the extent of the uplink coverage area may be determined at least partly by a transmission power of the communications device performing the uplink transmission. In one example, the higher the transmission power of the communications device, the larger the uplink coverage area within which the uplink transmission can be received by an infrastructure equipment. As will be appreciated transmitter and receiver capabilities between communications devices and infrastructure equipment vary. Typically, the downlink coverage area is larger than the uplink coverage area due to the higher transmission powers of infrastructure equipment compared with communications devices. This leads to scenarios in a wireless communications network where a communications device is located such that it can receive downlink transmissions but not uplink transmissions (i.e. the communications device is located within the downlink coverage area but not within the uplink coverage area). Uplink and downlink coverage areas which do not cover exactly the same geographical area are referred to as "asymmetric coverage areas".

The term "coverage area" will be used from this point forth when it is not necessary to distinguish between uplink and downlink coverage areas. Therefore, references to "coverage area" should be construed as meaning either the uplink coverage area, the downlink coverage area or both. Furthermore, the terms "uplink coverage area" and "downlink coverage area" will be used when it is necessary to distinguish between uplink and downlink coverage areas.

In Release-18 of the 3GPP Standards, a current work item (WI) is the improvement of uplink coverage [2]. It is understood in this WI that coverage is one of the key factors that a network operator considers when commercialising cellular communication networks due to its direct impact on service quality as well as capital expenditures and operating expenses. Furthermore, uplink performance in particular could be the bottleneck in many real deployment scenarios. For example, there are many emerging vertical use cases that have heavy uplink traffic such as video uploading. However, as will be explained below, the improvement of uplink coverage is subject to a number of technical challenges, particularly in the case of asymmetric coverage.

The consequences of asymmetric coverage include at least the following:

- Downlink pathloss and uplink pathloss may be different. This may require different power control methods for uplink and downlink transmissions.
- Uplink and downlink propagation delays may be different. This may impact on timing advanced (TA) mechanism.
- Channel reciprocity between uplink and downlink channels is not expected.

It has been suggested ([2]) that some of the technical challenges associated with asymmetric coverage are alleviated in dense deployment scenarios (where there are many communications devices close to one or more infrastructure equipment). For example, dense deployment scenarios are typically associated with lower pathloss due to the relatively short distances between communications devices and infrastructure equipment. In one example, the lower pathloss means that a wider bandwidth can be used for uplink transmissions using carrier aggregation while maintaining a relatively high power spectral density. However, dense deployments are associated with their own technical challenges. For example, a large cell planning effort may be required for inter-cell interference coordination, particularly to avoid communications collisions.

One solution which has been implemented to avoid collisions for uplink transmissions in a dense deployment is Uplink Co-ordinated Multipoint Transmission and Reception (CoMP) as will be now be explained.

Uplink Co-ordinated Multipoint Transmission and Reception (CoMP) in LTE

As mentioned above, dense deployment scenarios typically require inter-cell interference co-ordination to avoid communication collisions. One example of a known method for co-ordinating uplink transmissions to avoid uplink collisions is Uplink CoMP. There are currently two types of Uplink CoMP in LTE:

(i) Co-ordination between coverage areas (hereinafter referred to as the "First Type of Uplink CoMP")
(ii) Multiple Receptions at neighbouring coverage areas (hereinafter referred to as the "Second Type of Uplink CoMP").

Figures 4, 5:
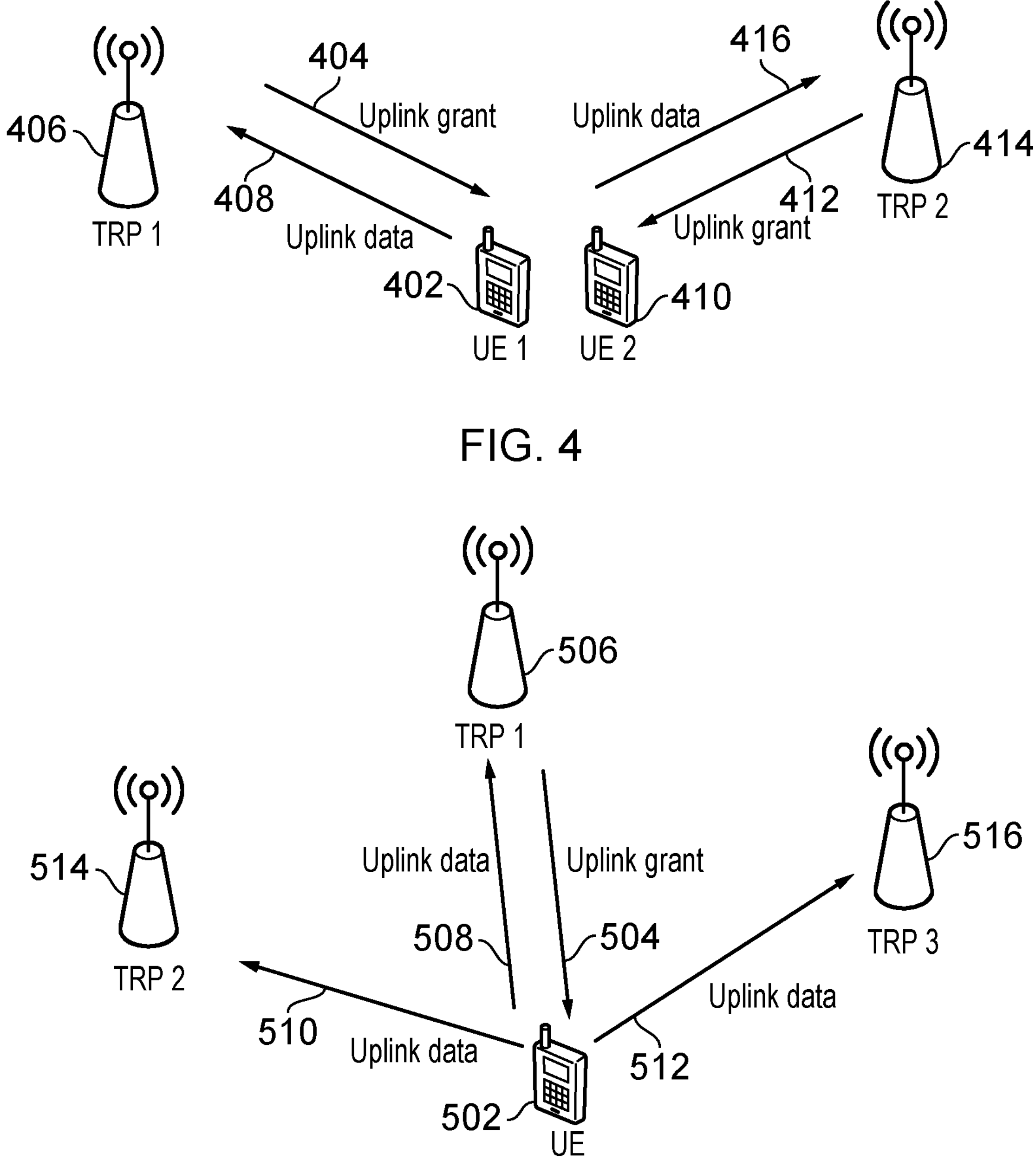
FIG. 4 schematically illustrates communications devices communicating with infrastructure equipment in accordance with a first type of Uplink CoMP.
FIG. 5 schematically illustrates communications devices communicating with infrastructure equipment in accordance with a second type of Uplink CoMP.

FIG. 4 schematically illustrates communications devices communicating with infrastructure equipment in accordance with the first type of Uplink CoMP. In particular, FIG. 4 illustrates a first UE 402 receiving an uplink grant 404 from a first TRP 406 and transmitting uplink data 408 to the first TRP 406 in accordance with the uplink grant 404. FIG. 4 also illustrates a second UE 410 receiving an uplink grant 412 from a second TRP 414 and transmitting uplink data 416 to the second TRP 414 in accordance with the uplink grant 412. Although not shown in FIG. 4, the first TRP 406 provides a coverage area for the first UE 402 and the second TRP 414 provides a coverage area for the second UE 410. If the first UE 402 is close to an edge of the coverage area provided by the first TRP 406, then the transmission of the uplink data 408 to the first TRP 406 may also reach the second TRP 414. For example, the first UE 402 may be located in an area of overlap of the coverage area provided by the first TRP 406 and the coverage area provided by the second TRP 414. Therefore, if the first UE 402 transmits the uplink data 408 to the first TRP 406 at the same time as the second UE 410 transmits the uplink data 416 to the second TRP 414, then the uplink data transmissions 408, 416 may collide. In accordance with the first type of uplink CoMP, when the first TRP 406 sends the uplink grant 404 to the first UE 402, the second TRP 414 refrains from sending the uplink grant 412 to the second UE 410. Similarly, when the second TRP 414 sends the uplink grant 412 to the second UE 410, the first TRP 406 refrains from sending the uplink grant 404 to the first UE 402. This is an example of time scheduling (for example, uplink transmissions in different subframes). The first type of uplink CoMP also includes orthogonal methods such as frequency scheduling (uplink transmissions on different resource blocks) and space multiplexing (uplink receiver beamforming).

FIG. 5 schematically illustrates a communications device communicating with infrastructure equipment in accordance with the second type of Uplink CoMP. FIG. 5 illustrates a UE 502 receiving an uplink grant 504 from a first TRP 506. As represented by arrow 508, the UE 502 transmits uplink data to the first TRP 506 in accordance with the uplink grant 504. As represented by arrows 510 and 512, the same uplink data is received at a second TRP 514 and a third TRP 516 respectively. A DU and/or CU connected to the first TRP 506 (not shown for clarity) can combine the uplink data (e.g. maximum likelihood combining at decoder) received from the three TRPs 506, 514, 516 (under the assumption that all three TRPs 506, 514, 516 are connected to the same DU/CU with ideal backhaul, i.e., optical fibre). As mentioned above, the first TRP 506, the second TRP 514 and the third TRP 516 may be connected to the same DU which is connected to a CU. A limitation of this arrangement is that it is impossible for the DU and/or CU to set different timing advances for communications devices served by the first TRP 506, the second TRP 514 and the third TRP 516. Furthermore, the fronthaul delay between each TRP 506, 514, 516 and DU and/or CU should be very short (i.e., ideal backhaul), otherwise it is impossible to combine the signals. On the other hand, no special UE capability is required for supporting uplink CoMP. This is because the functions of uplink CoMP are transparent from the UE perspective.

However, it will be appreciated that, in other arrangements, each of the TRPs 506, 514, 516 are not connected to the same DU. In an alternative example, each TRP 506, 514 and 516 is implemented at the same location to process the physical layer.

As explained above, uplink CoMP can provide mechanisms for reduced uplink interference in dense deployment scenarios. However, existing Uplink CoMP techniques are not easily applied to current NR networks. This is because NR networks make use of beamforming for directional transmissions between communications devices and infrastructure equipment. However, it is expected to be difficult to adapt LTE Uplink CoMP techniques to NR due antenna limitations of LTE UEs.

3GPP have suggested ([2]) that one solution to improve reduce uplink interference in dense deployment scenarios is to deploy "uplink-only access points". Currently, uplink-only access points can be provided by using one or more of Carrier Aggregation (CA), Dual Connectivity (DC) and Supplementary Uplink (SUL) as will be explained below.

Carrier Aggregation (CA) and Dual Connectivity (DC)

Known techniques for providing uplink-only access points include Carrier Aggregation (CA) and Dual Connectivity (DC).

In carrier aggregation, communications between communications devices and infrastructure equipment can be performed over more than one component carrier. As will be appreciated by one skilled in the art, communications may be performed using a Primary Carrier (referred to as "PCell") and a Secondary Carrier (referred to as "SCell"). Typically, the primary carrier communicates user plane data and control plane signalling and is therefore always active. By contrast, the secondary carrier only communicates user plane data. Therefore, secondary carriers may be selectively activated or deactivated depending on user plane data traffic. Carrier aggregation is configured by a Media Access Control (MAC) layer. Therefore, as will be appreciated by one skilled in the art, the primary and secondary carrier should be controlled by the same scheduler in MAC layer. It is possible to deploy a primary carrier in one location and a secondary carrier in another location if there is a good backhaul link. For example, a primary carrier may be deployed in one location for uplink and downlink transmissions whereas a secondary carrier may be deployed in another location for uplink-only transmissions. In this way, carrier aggregation can be used to provide uplink-only access points.

Dual connectivity is similar to carrier aggregation. However, in dual connectivity, a communications device such a UE can simultaneously connect to two different infrastructure equipment such as two different base stations. One such base station may be referred to as the master cell group (MCG), whereas the other base station is referred to as the secondary cell group (SCG). The MCG and the SCG may provide different coverage areas. For example, the UE may communicate with the MCG using one carrier frequency and may simultaneously communicate with the SCG using another carrier frequency. For example, the MCG may provide a coverage area for both downlink and uplink transmissions whereas the SCG may provide an uplink coverage area for uplink transmissions only. In this way, dual connectivity can be used to provide uplink-only access points.

As will be appreciated by one skilled in the art, dual connectivity is handled by a common Packet Data Convergence Protocol (PDCP) layer entity for the communications links between the UE and the MCG, and between the UE and the SCG. The communications link between the UE and the MCG has a Radio Link Control (RLC), MAC and PHY entity. The communications link between the UE and the SCG has its own separate RLC, MAC and PHY entities. Therefore, traffic can be aggregated at the common PDCP layer. For example, downlink traffic can be aggregated at the common PDCP layer at the UE.

Dual Connectivity allows for the independent operation of the communications links and, consequently, increased flexibility. Therefore, dual connectivity can be used for not only base stations in the same wireless communications network but also for base stations in other wireless communications networks. For example, the MCG or SCG may form part of an LTE network and the other of the MCG or SCG may form part of an NR network.

A drawback of both carrier aggregation and dual connectivity is an increase in hardware complexity for the communications device. For example, in carrier aggregation and dual connectivity, a communications device requires more than transmitter and receiver. Furthermore, there are many possible combinations of carriers depending on a mobile network operator. It is therefore likely to be complex for a communications device to support all combinations of carriers.

One solution for implementing uplink-only access point while reducing communications device hardware complexity is supplementary uplink as will be explained in more detail below.

NR Supplementary Uplink (SUL)

New Radio (NR) introduced the technique of "Supplementary Uplink", which refers to the configuration of a communications device with two separate uplink carriers. An example of supplementary uplink compared with conventional uplink/downlink is shown in FIGS. 6A and 6B.

Figure 6A:
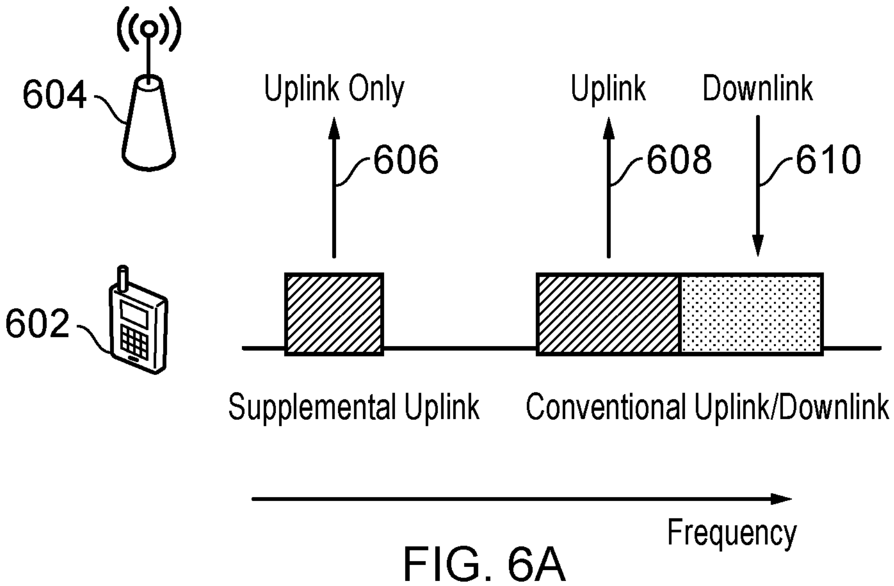
FIG. 6A schematically illustrates a communications device communicating with infrastructure equipment in accordance with supplementary uplink.
Figure 6B:
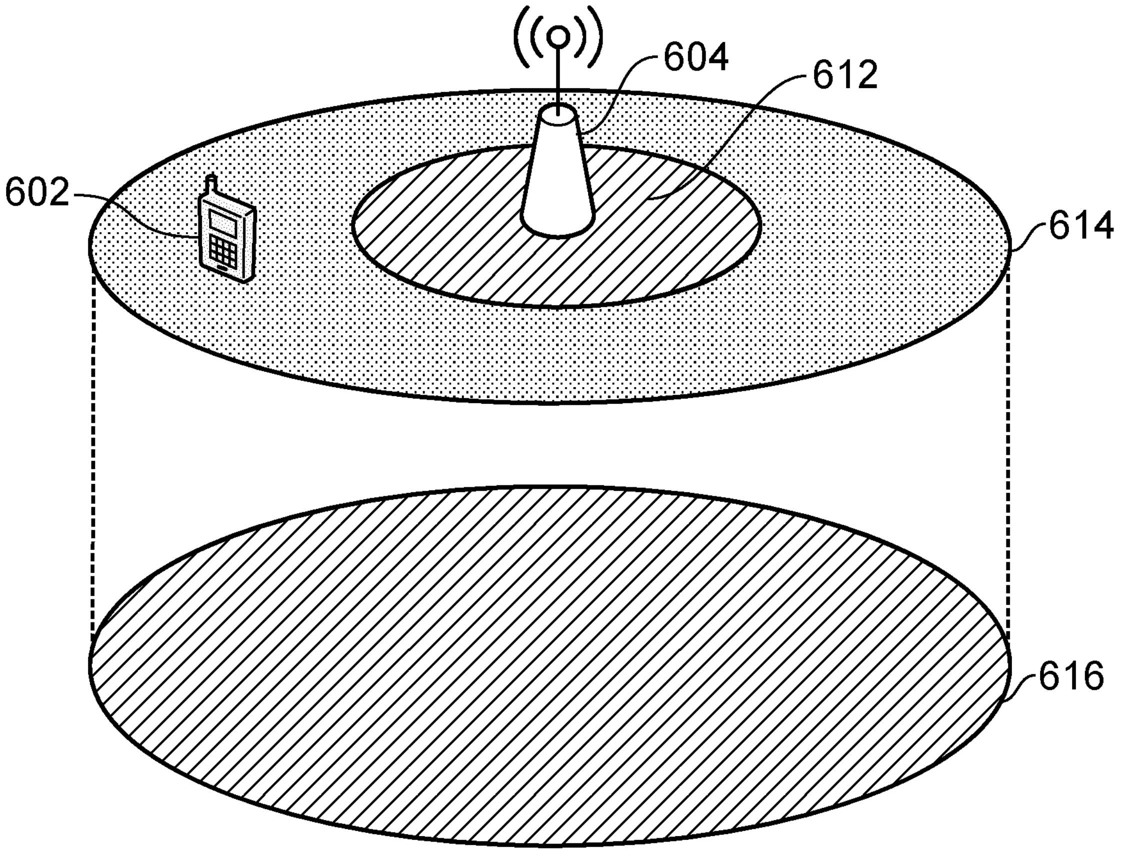
FIG. 6B schematically illustrates a communications device communicating with infrastructure equipment in accordance with supplementary uplink.

As shown in FIG. 6A, a communications device 602 is configured to transmit a conventional uplink transmission 608 to a TRP 604 and to receive a conventional downlink transmission 610 from the TRP 604. Although not shown in FIG. 6A, the TRP 604 forms part of infrastructure equipment which may also include a DU and/or CU. The conventional uplink transmission 608 and the conventional downlink transmission 610 may be transmitted according to Frequency Division Duplexing (FFD) techniques or Time Division Duplexing (TDD) techniques. In addition, in accordance with the principles of supplementary uplink, the communications device 602 is also configured to transmit a supplementary uplink transmission 606 to the TRP 604. Although the communications device 602 is configured to perform a conventional uplink transmission 608 and a supplementary uplink transmission 606, it cannot perform both uplink transmissions 606, 608 at the same time.

The supplementary uplink transmission 606 is on a carrier which is reserved for uplink transmissions only. A frequency and bandwidth of the carrier used for the uplink transmission 606 is controlled by a network operator and therefore depends on the frequency planning of the network operator. A bandwidth of the carrier used for the supplementary uplink transmission 606 is typically narrower than a bandwidth of a carrier of the conventional uplink transmission 608. Additionally, a frequency of the carrier used for the supplementary uplink transmission 606 is typically lower than a frequency of a carrier of the conventional uplink transmission 608. As will be appreciated, the use of a lower frequency carrier can improve uplink coverage by reducing pathloss. However, the use of a narrower bandwidth means that the carrier has a lower capacity for carrying data.

In the example shown in FIG. 6A, the carrier for the supplementary uplink transmission 606 and the carrier for the conventional uplink transmission 608 are co-located on the same site. In other words, although the frequency of the carrier for the supplementary uplink transmission 606 and the conventional uplink transmission 608 is different, the same TRP, DU and CU controls scheduling of the carrier for the supplementary uplink transmission 606 and the carrier for the conventional uplink transmission 608.

As shown in FIG. 6B, the TRP 604 provides a conventional downlink coverage area 614 in which the conventional downlink transmission 610 may be transmitted to the communications device 602, a conventional uplink coverage area 612 in which the conventional uplink transmission 608 may be received from the communications device 602 and a supplementary uplink coverage area 616 in which the supplementary uplink transmission 606 may be received from the communications device 602 As explained above, since the carrier for the supplementary uplink transmission 606 has a lower frequency than the carrier for the conventional uplink transmission 608, then the pathloss is lower and therefore the supplementary uplink coverage area 616 is larger than the conventional uplink coverage area 612.

From a communications device complexity perspective, supplementary uplink may be simpler than carrier aggregation or dual connectivity. In supplementary uplink, the communications device does not have to receive the downlink transmissions on the carrier reserved for supplementary uplink because this carrier is reserved for uplink transmissions only. Therefore, the communications device does not require additional receiver functions beyond those required to receive conventional downlink transmissions. Accordingly, communications device hardware complexity is reduced.

However, arrangements shown in FIGS. 6A and 6B may not be suitable for heavy uplink traffic use cases (such as video uploading). As mentioned previously, if a low frequency is used for the supplementary carrier then the corresponding bandwidth is narrower. Therefore, as will be explained with reference to FIG. 7, it is possible to use a higher frequency for the supplementary carrier which increases bandwidth. However, a higher frequency also means increased pathloss and therefore a reduced coverage area for supplementary uplink. Therefore, a plurality of TRPs are deployed as uplink-only access points to extend the coverage area provided for uplink-only transmissions. Such an arrangement is shown in FIG. 7.

Figure 7:
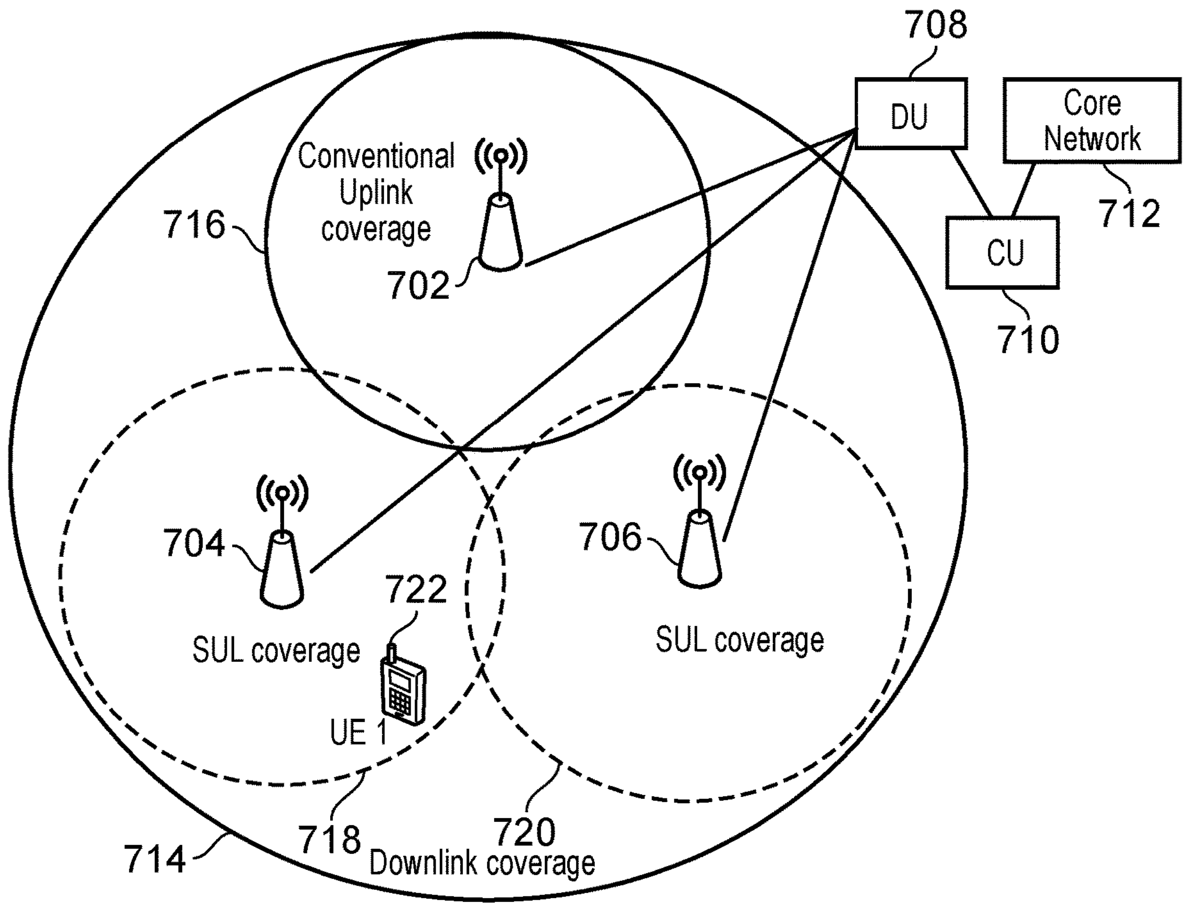
FIG. 7 schematically illustrates a wireless communications network in which communications devices communicate with infrastructure equipment in accordance with supplementary uplink.

FIG. 7 schematically illustrates wireless communications network comprising a plurality of TRPs 702, 704, 706 each connected to a distributed unit 708. The distributed unit 708 is connected to a central unit 710 and the central unit 710 is connected to a core network 712. The plurality of TRPs 702, 704, 706 comprise a conventional TRP 702 for providing conventional uplink and downlink coverage, a first supplementary TRP 704 for providing supplementary uplink coverage and a second supplementary TRP 706 for providing supplementary uplink coverage. The conventional TRP 702 provides a downlink coverage area 714 and an uplink coverage area 716. The first supplementary uplink TRP 704 provides a first supplementary uplink coverage area 718 and the second supplementary uplink TRP 706 provides a second supplementary uplink coverage area 720. In FIG. 7, the conventional uplink coverage area 716, the first supplementary uplink coverage area 718 and the second supplementary uplink coverage area are provided at different locations. Although the uplink coverage areas 716, 718 720 are shown as partially overlapping, it will be appreciated that, in other arrangements, the uplink coverage areas 716, 718 720 do not overlap.

As shown in FIG. 7, a communications device 722 is located within the first supplementary uplink coverage area 718 and is outside the conventional uplink coverage area 716. Therefore, the communications device 722 cannot perform uplink transmissions with the conventional uplink TRP 702 but can perform uplink transmissions with the first supplementary uplink TRP 704. For further details of supplementary uplink can be found in TS 38.101-1 [3], which is hereby incorporated by reference in its entirety.

As discussed above, the realisation of dense deployment for uplink in asymmetric coverage scenarios can be achieved by reducing inter-cell interference techniques, such as Uplink CoMP, and/or the deployment of uplink-only access points as part of carrier aggregation, dual connectivity and/or supplementary uplink.

The implementation of such uplink-only access points in dense deployment scenarios creates further technical challenges in NR networks. For example, current NR networks make use of beamforming to efficiently transmit and receive directional signals and, as explained above, it is difficult to apply beamforming techniques to uplink CoMP due to UE antenna limitations. Furthermore, existing beamforming techniques rely on the assumption of channel reciprocity between uplink and downlink channels which, as will be explained with reference to FIG. 8 below, do not apply for uplink-only access points such as those formed in supplementary uplink, carrier aggregation and dual connectivity scenarios.

Beam Forming

Conventional Initial Beam Establishment

Conventional initial beam establishment procedures, which were developed in Release-15 of the 3GPP standards, involve the following steps:

- A gNB sweeps a downlink beam of SSBs with different transmission timing.
- A UE attempts to receive the downlink beams of SSBs from the gNB.
- The UE determines the best downlink beam among from among the downlink beams.
- After UE determines the best downlink beam, the UE starts a random access procedure with the same space filter (beamforming) as was used for the transmission of the downlink beams. In other words, RACH is transmitted with uplink beamforming using the same space filter as was used for the transmission of the downlink beams.

Figure 8:
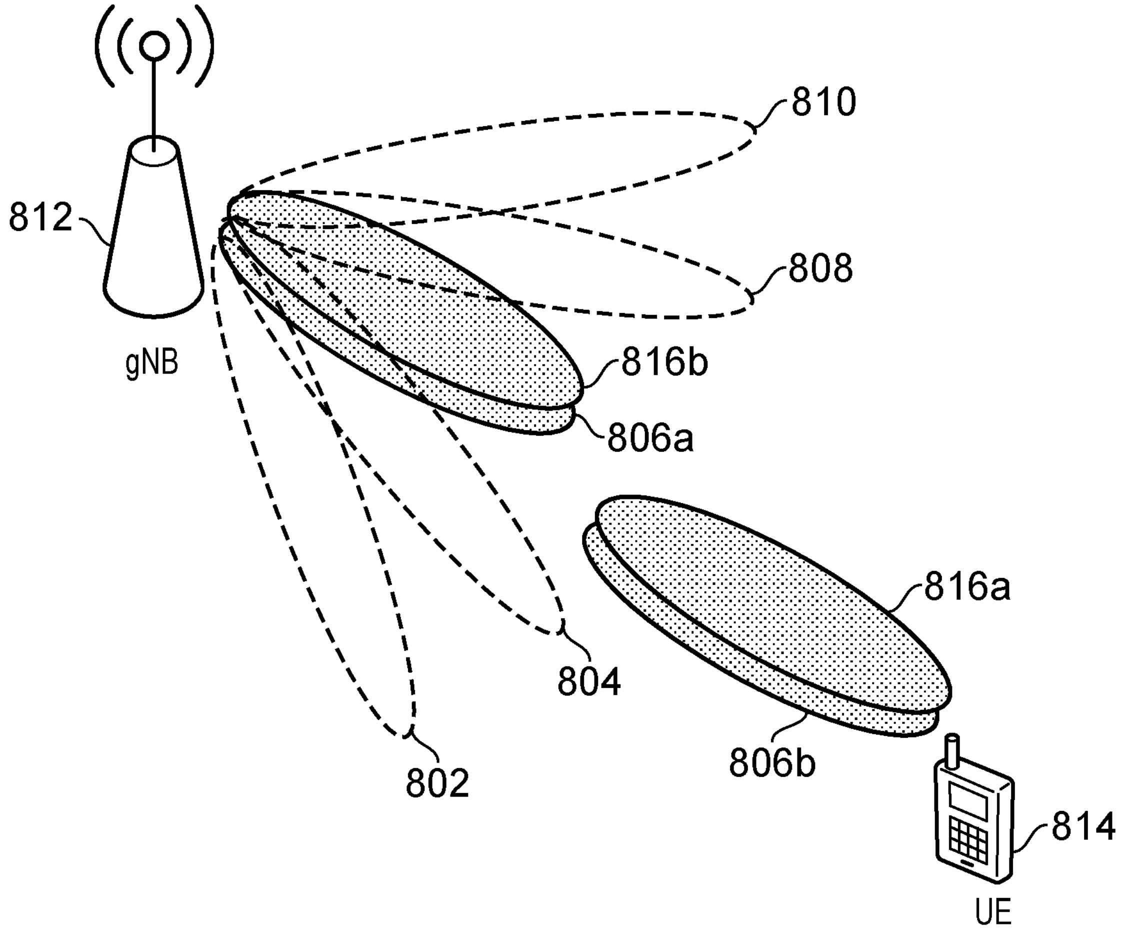
FIG. 8 schematically illustrates downlink beamforming between infrastructure equipment and a communications device.

This procedure is described in more detail with respect to FIG. 8. FIG. 8 illustrates conventional downlink beam sweeping between infrastructure equipment and a communications device. In particular, FIG. 8 schematically illustrates a gNB 812 transmitting a plurality of directional downlink beams to a communications device 814 (which may be a UE for example). Although not shown in FIG. 8, the gNB 812 may include a TRP, DU and/or CU. Conceptually, each directional downlink beam can be considered as being comprised of a downlink transmission beam and a downlink reception beam known as a "beam pair". Therefore, references to "downlink beam" will be used when it is not necessary to distinguish between the downlink transmission beam and the downlink reception beam in the beam pair. Consequently, the terms "downlink transmission beam" and "downlink reception beam" will be used when it is necessary to distinguish between those beams.

For clarity purposes, FIG. 8 illustrates a plurality of downlink transmission beams 802, 804, 806*a*, 808, 810 which are transmitted by the gNB 812 at different transmission timings, and one downlink reception beam 806*b* which is received by the communications device 814. The downlink transmission beam 806*a* and the downlink reception beam 806 form a beam pair. It will we appreciated that each of the other downlink transmission beams 802, 804, 808, 810 have a corresponding downlink reception beam which is received by the communications device 814, although this is not shown in FIG. 8 for clarity.

The transmission of the plurality of downlink transmission beams 802, 804, 806*a*, 808, 810 by the gNB 812 is referred to as "downlink beam sweeping". The gNB 812 may activate one or more of the plurality of downlink transmission beams (802, 804, 806*a*, 808, 810) at a time. In other words, the gNB 812 may perform transmission in one or more spatial directions at a time and change these in turn to cover some or all of plurality of downlink transmission beams 802, 804, 806*a*, 808, 810 according to predetermined directions and intervals.

Each downlink transmission beam may be characterised by a variance in gain with respect to a direction from the antenna; a beam may be considered 'wide', where the gain is consistently relatively high over a broad range of directions, or 'narrow', where relatively high gain is only achieved over a narrow range of directions. A wider beam can be based on synchronisation signal blocks (SSBs) intended for example during initial access (in the RRC_IDLE and RRC_INACTIVE states) while a narrower beam can be formed from channel state information reference signals (CSI-RSs) intended for example for UE-specific beamforming in RRC_CONNECTED state. Downlink transmission beams may be formed for transmitting at the gNB 812 using phased antenna arrays, directional antennas, a combination of both, or other known techniques.

In FIG. 8, the communications device 814 receives a plurality of downlink reception beams corresponding to the plurality of downlink transmission beams 802, 804, 806*a*, 808, 810, transmitted by the gNB 812. Depending on the direction of the communications device 814 with respect to the gNB 812, the gain of a particular downlink reception beam may be sufficiently high (and the resulting coupling loss sufficiently low) to permit communications between the communications device 814 and the gNB 812 via the downlink transmission beam and corresponding downlink reception beam forming a beam pair. Beams may be formed for receiving at the communications device 814 using phased antenna arrays, directional antennas, a combination of both, or other known techniques.

After receiving the plurality of downlink reception beams, the communications device 814 performs measurements on each of the received plurality of downlink reception beams and, based on the measurements, determines the "optimal" downlink reception beam. The measurements may be measurements of SSB and/or CSI-RS in each of the received downlink reception beams. In one example, the communications device 814 may measure a received signal strength of each of the plurality of downlink reception beams, and determine that the "optimal" directional downlink beam is the beam which has the highest measured received signal strength. In one example, as illustrated in FIG. 8, the communications device 814 performs measurements on downlink reception beam 806*b* and determines based on the measurements that beam 806*b* is the optimal downlink reception beam. Then, the communications device 814 transmits an indication to the gNB 812 indicating the optimal downlink transmission beam which corresponds to the optimal downlink reception beam in the beam pair. In the example illustrated in FIG. 8, the communications device 814 transmits an indication to the gNB 812 indicating that the optimal downlink transmission beam is downlink transmission beam 806*a*. Accordingly, the optimal downlink beam pair consisting of the optimal downlink transmission beam 806*a* and the optimal downlink reception beam 806*b* is determined.

Typically, in symmetric uplink and downlink coverage scenarios, the technique of beam correspondence is employed to efficiently determine an uplink beam pair once a downlink beam pair has already been determined. Beam correspondence refers to the ability of a communications device to select a suitable beam pair for uplink transmission based on downlink measurements with or without relying on uplink beam sweeping. For example, the determination of the uplink beam pair may be based on the measurements of the downlink reception beams performed by the communications device. In a particular example, the communications device 814 may determine an optimal uplink beam transmission beam pair based on measurements of SSB and/or CSI-RS in the received downlink reception beams. Conventionally, beam correspondence relies on assuming that a Type D Quasi Colocation (QCL) between the downlink beam pair and the uplink beam pair is the same. For example, in FIG. 8, an uplink beam pair is determined by beam correspondence and consists of an uplink transmission beam 816*a* transmitted by the communications device 814 and a corresponding uplink reception beam 816*b* is received by the gNB 812. Since the Type D QCL has been assumed to be the same between the downlink beam pair and the uplink beam pair, the uplink beam pair is along the same axis as the uplink beam pair.

Conventional Beam Adjustment

Conventional beam adjustment procedures, which were developed in Release-15 of the 3GPP standards, involve the following steps:

- A gNB 812 sends a reference signal (CSI-RS) or SS blocks on multiple downlink beams.
- The communications device 814 reports the best beam to gNB 812 and the gNB 812 uses it as the best downlink beam.
- After the best downlink beam has been determined, the communications device 814 receives multiple downlink beams (beam sweep based on CSI-RS or SS blocks) and detects the best downlink beam among received multiple downlink beams. If the same frequency is used for uplink and downlink, channel reciprocity is expected. In that case, the uplink beam pair adjustment is omitted because the same spatial filter (beam) as downlink can be used for uplink if beam correspondence is applied.

Conventional Beam Failure Detection and Discovery

Figure 9:
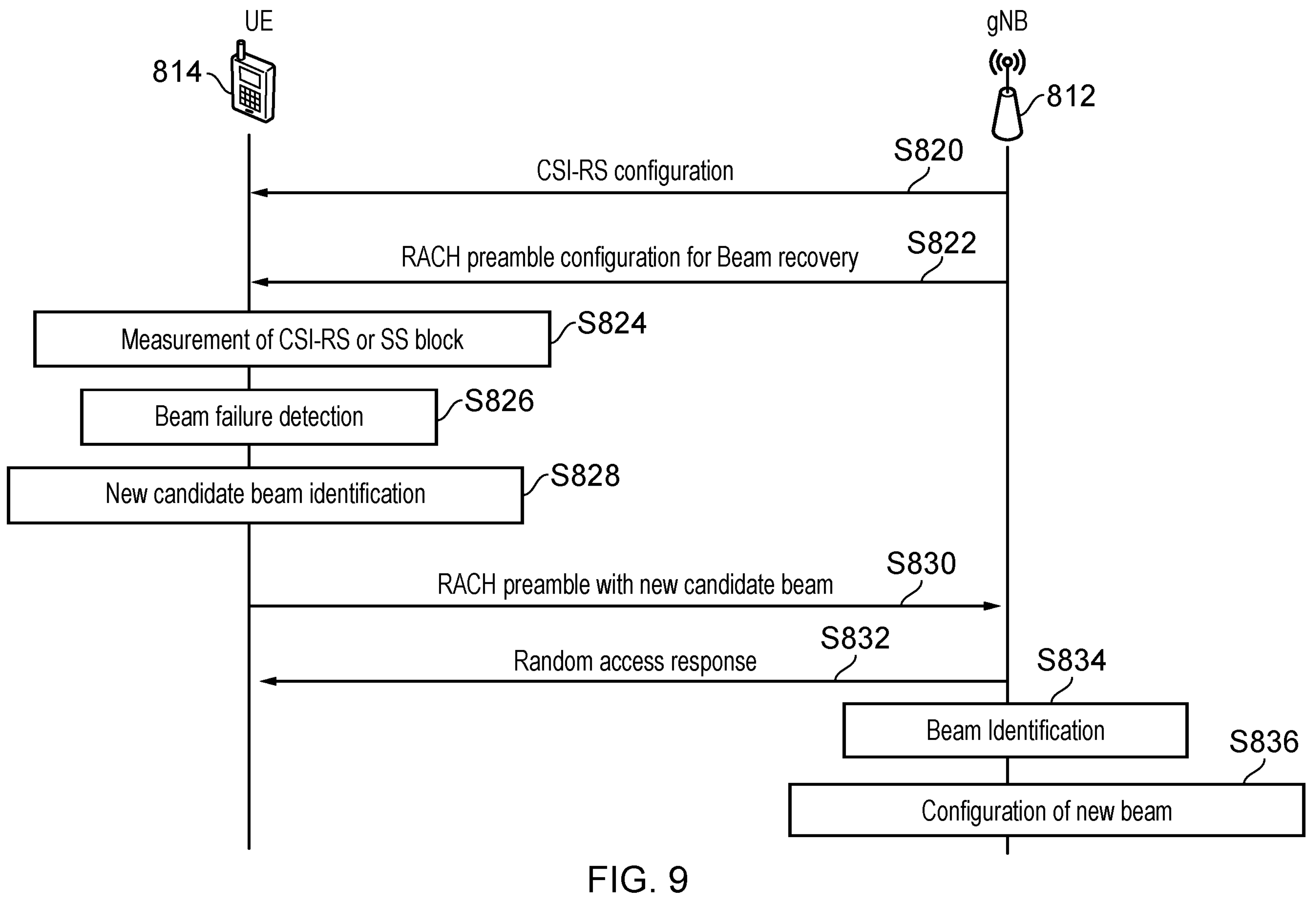
FIG. 9 schematically illustrates a conventional beam adjustment procedure.

Conventional Beam Failure Detection and Discovery procedures, which were developed in Release-15 of the 3GPP standards, involve the following steps which are described with respect to FIG. 9:

In step S820, gNB 812 configures and transmits a set of CSI-RS for downlink beams (if CSI-RS is used).

In step S822, gNB 812 configures the RACH preambles for beam recovery. There are a number of options for association of preamble and beam. For example, each downlink beam may have a unique preamble, or group of downlink beams has a group of unique preambles, or preamble is not associated to a downlink beam.

In step S824, the communications device 814 uses the downlink measurement based on either L1-RSRP level of CSI-RS or that of SS block.

In step S826, the communications device 814 makes a decision on the beam failure detection. A detailed description of processes performed in the MAC layer is shown in reference [2], which is hereby incorporated by reference in its entirety. A detailed description the RRC parameters are shown in reference [4], which is hereby incorporated by reference in its entirety.

In step S828, the communications device 814 identifies the new beam among multiple beams In step S830, the communications device 814 sends the RACH preamble, which may (or may not) indicate the selected beam.

In step S832, the gNB 812 send back random access response (RAR)

In step S834, the gNB 812 decides the beam pair.

In step S836, gNB 812 configures the new beam pair to communications device 814 and start to send data.

Therefore conventional beam failure detection and discovery procedures rely on downlink measurements performed by the communications device 814 which are reported to the gNB 821.

As explained above, conventional beamforming procedures such as initial beam establishment, beam adjustment and beam failure detection and discovery procedures rely on channel reciprocity/beam correspondence. However, in the case of asymmetric coverage scenarios, the technique of beam correspondence cannot be accurately employed. As mentioned above, channel reciprocity is not expected in asymmetric coverage scenarios. For example, in supplementary uplink, the frequency of supplementary uplink transmission is different from the frequency of conventional downlink transmission (as described above with reference to FIG. 6). Furthermore, the Type D QCL for the downlink beam pair and the uplink beam pair will generally not be the same because of the different antenna locations (for example, with reference to FIG. 7, the gNBs 704, 706 for supplementary uplink coverage are physically located at a different position than the conventional gNB 702 which provides downlink coverage).

Accordingly, technical challenges exist in efficiently providing improved uplink coverage.

Figure 10:
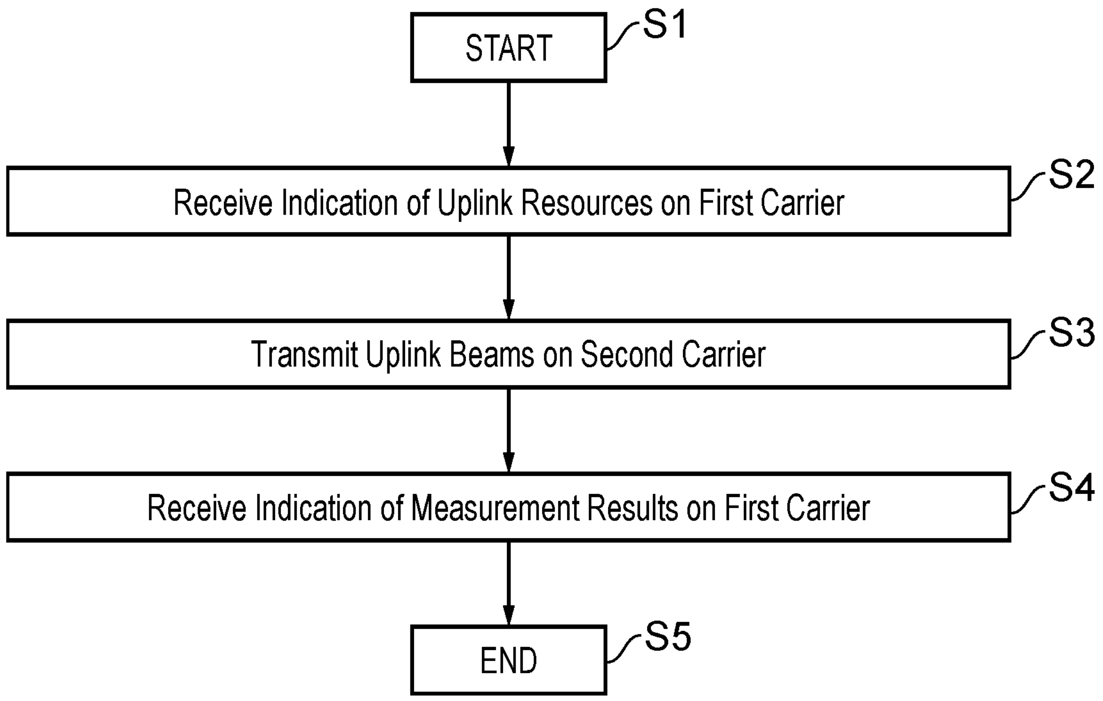
FIG. 10 shows a flow diagram illustrating a process of communications performed by a communications device in accordance with embodiments of the present technique.

In view of the above, example embodiments can provide methods, communications devices and infrastructure equipment to efficiently improve uplink coverage. FIG. 10 shows a flow diagram illustrating an example process of communications in a wireless communications network in accordance with embodiments of the present technique. The process shown by FIG. 10 is a method of operating a communications device for transmitting signals to and/or receiving signals from infrastructure equipment of a wireless communications network. The method starts in step S1.

In step S2, the communications device receives, from the infrastructure equipment on a first carrier for the communications device, an indication of uplink resources for transmitting a plurality of directional uplink beams to the infrastructure equipment on a second carrier for the communications device. The second carrier is an uplink-only carrier. The second carrier may or may not have a different frequency than the first carrier. The first carrier may correspond to a "conventional carrier" as described below. In some embodiments, the first carrier provides a downlink coverage area for the communications device within which the communications device can receive downlink transmissions from the infrastructure equipment. In some embodiments, the first carrier may be a bi-directional carrier which can transmit downlink transmissions to the communications device and receive uplink transmissions from the communications device. In other embodiments, the first carrier may be used only for downlink transmissions from the infrastructure equipment to the communications device. In some embodiments, the indication of uplink resources is an SRS configuration. The SRS configuration may comprise a pattern or arrangement of a plurality of SRSs in the indicated uplink resources. In some embodiments, the infrastructure equipment may comprise a first antenna port and a second antenna port located at physically different locations. In some embodiments, the first carrier is provided by the first antenna port as a conventional carrier and the uplink-only carrier is received by the second antenna port as a supplementary uplink carrier. As will be appreciated by one skilled in the art, the term "carrier" may be used interchangeably with the term "cell". Therefore, the first carrier may be a conventional cell whereas the uplink-only carrier may be an uplink-only cell.

In step S3, the communications device transmits the plurality of directional uplink beams to the infrastructure equipment on the second carrier in accordance with the uplink resources indicated by the infrastructure equipment. Each of the plurality of directional uplink beams may be transmitted at different transmission timings and in different spatial directions (for example, similar to the transmission shown in FIG. 8). In some embodiments, the communications device may transmit the plurality of directional uplink beams according to the SRS configuration.

In step S4, the communications device receives, from the infrastructure equipment on the first carrier, an indication of a result of measurements performed on the plurality of directional uplink beams transmitted on the second carrier. In some embodiments, the measurement results may comprise an indication of a selected one of the plurality of directional uplink beams transmitted by the communications device on the second carrier. In other words, the infrastructure equipment may base the selection on measurements performed on the plurality of directional uplink beams. For example, the infrastructure may select the beam which is received at the infrastructure equipment with the highest received signal strength. In other embodiments, the measurement results may comprise a failure indication indicating that one of the plurality of directional uplink beams could not be selected. For example, the infrastructure equipment may determine that none of the plurality of directional uplink beams satisfy pre-determined criteria. In one example, the infrastructure equipment may measure a received signal strength for each of the plurality of directional uplink beams and determine that the received signal strength is below a pre-defined threshold for each of the plurality of directional uplink. If the communications device receives a failure indication, the communications device may re-perform an initial access procedure (such as RACH) with the infrastructure equipment. The communications device may re-perform beam transmission to give the infrastructure equipment another opportunity to select on the plurality of directional uplink beams. The method ends in step S5.

Therefore the method described in FIG. 10 allows for a communications device to determine a selected directional uplink beam for subsequent uplink transmissions to the infrastructure equipment on the uplink-only carrier. The selected directional uplink beam may specifically be a selected directional uplink reception beam (i.e. a directional uplink beam which has been received by the infrastructure equipment). A directional uplink transmission beam (i.e. a directional uplink beam which has been transmitted by the communications device) may be determined by the communications device in response to receiving an indication of the selected directional uplink reception beam from the infrastructure equipment. For example, the communications device may determine that the directional uplink transmission beam which is along the same spatial direction as the selected directional uplink reception beam is the selected directional uplink transmission beam. Accordingly, the selected directional uplink transmission and reception beam form a selected uplink beam pair which can be used for subsequent beamforming uplink transmissions by the communications device on the uplink-only carrier. Therefore, the method described in FIG. 10 allows the determination of an optimal or best directional uplink beam for uplink transmissions on the uplink-only carrier without relying on channel reciprocity.

Therefore, in an asymmetric coverage scenario, uplink coverage can be improved by a dense deployment of communications devices but communications efficiency is not compromised. In other words, since channel reciprocity does not apply for carriers with different frequencies and/or carriers which are transmitted to/received from different locations, the method described in FIG. 10 allows for the determination of an optimal or best uplink beam without relying on channel reciprocity, and therefore allows for beamforming techniques to be used in scenarios where channel reciprocity is not applicable.

Figure 11:
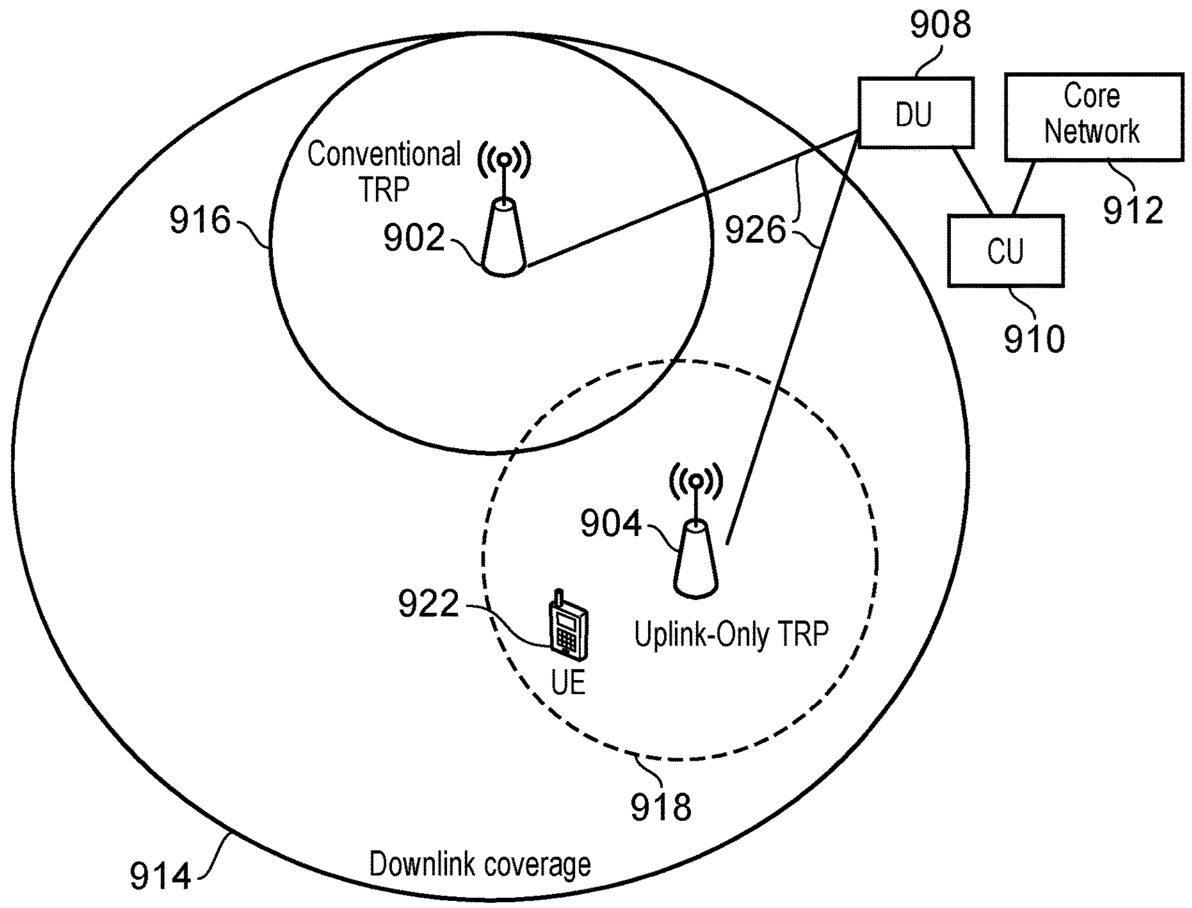
FIG. 11 schematically illustrates a wireless communications network in which a communications device performs uplink-only communication with infrastructure equipment in accordance with example embodiments.

Example embodiments will be further explained below with reference to the example wireless communications network illustrated in FIG. 11. FIG. 11 schematically illustrates communications between a communications device and infrastructure equipment in an asymmetric coverage scenario. In particular, FIG. 11 schematically illustrates wireless communications network comprising a plurality of TRPs 902, 904 each connected to a distributed unit 908 via respective fronthaul links 926. The distributed unit 908 is connected to a central unit 910 and the central unit 910 is connected to a core network 912. The plurality of TRPs 902, 904 comprise a conventional TRP 902 for providing conventional uplink and downlink coverage, and an uplink-only TRP 904 for providing uplink-only coverage. The conventional TRP 902 provides a downlink coverage area 914 and an uplink coverage area 916. The conventional TRP 902 performs downlink transmissions using a "conventional carrier". In some embodiments, when the conventional TRP 902 is operating in accordance with a TDD mode of operation, the conventional carrier is bi-directional. In other words, uplink and downlink transmissions can be transmitted on the conventional carrier. When the conventional TRP 902 is operating in accordance with an FDD mode of operation, the conventional carrier may only be available for downlink transmissions to the communications device 922.

The uplink-only TRP 904 provides an uplink-only coverage area 918. Alternatively stated, the uplink-only TRP 904 is configured to receive uplink transmissions on an uplink-only carrier. The uplink-only carrier may or may not have a different frequency than the conventional carrier used with the conventional TRP 902.

In FIG. 11, the conventional uplink coverage area 916 and the uplink-only coverage area 918 are provided at different locations, although they may be co-located as shown for example in FIG. 6B. Although the uplink coverage areas 916, 918 are shown as partially overlapping, it will be appreciated that, in other arrangements, the uplink coverage areas 916, 918 do not overlap.

As shown in FIG. 11, a communications device 922 is located within the uplink-only coverage area 918 and is outside the conventional uplink coverage area 916. Therefore, the communications device 922 cannot perform uplink transmissions with the conventional uplink TRP 902 but can perform uplink transmissions with the uplink-only TRP 904.

As will be appreciated, the CU 910 controls control plane signalling to and from the conventional TRP 902 and the uplink-only TRP 904. For example, the CU 910 is configured to control Radio Resource Control (RRC) signalling to and from the conventional TRP 902 and the uplink-only TRP 904. The DU 908 is configured to control baseband processing and scheduling for the conventional TRP 902 and the uplink-only TRP 904. As will be appreciated, the uplink-only TRP 904 is connected to the same DU 908 and CU 910 as the conventional TRP 902 because the uplink-only TRP 904 and the conventional TRP 902 share the same RRC protocol header and scheduler.

The conventional TRP 902 is configured to transmit and receive signals to and from the communications device 822. For example, the TRP 902 is configured to transmit downlink transmissions to, and receive uplink transmissions from, the communications device 922. The conventional TRP 902 is configured to receive signals from the communications device 922. For example, the TRP 902 is configured to receive uplink transmissions from the communications device 922 which may be passed onto the CU 910 or core network 912 via the DU 908. In one example, the conventional TRP 902 may broadly correspond to the conventional TRP 702 shown in FIG. 7 and the uplink-only TRP 904 may correspond broadly to one of the supplementary uplink TRPs 704, 706 shown in FIG. 7. In another example, in a dual connectivity scenario, the conventional TRP 902 may belong to an MCG and the uplink-only TRP 904 may belong to an SCG. In another example, in a carrier aggregation scenario, the conventional TRP 902 may transmit downlink transmissions and receive uplink transmissions on a primary carrier, and the uplink-only TRP 904 may receive uplink transmissions on a secondary carrier.

Although FIG. 11 illustrates physically separate TRPs, a DU and CU, the physical arrangement of these nodes can be altered by the network operator. For example, the functions performed by the conventional TRP 902, the DU 908 and the CU 910 may be performed by a single apparatus. Similarly, the functions performed by the uplink-only TRP 904, the DU 908 and the CU 910 may be performed by a single apparatus. In some arrangements, the functions performed by the conventional TRP 902, the uplink-only TRP 904, the DU 908 and the CU 910 may be performed by the same apparatus. Therefore, although the foregoing disclosure will separately refer to "TRPs", "DUs", and "CUs" for the purposes of clarity, this should not be construed as implying that these components are necessarily located on physically separate apparatus.

Figure 12:
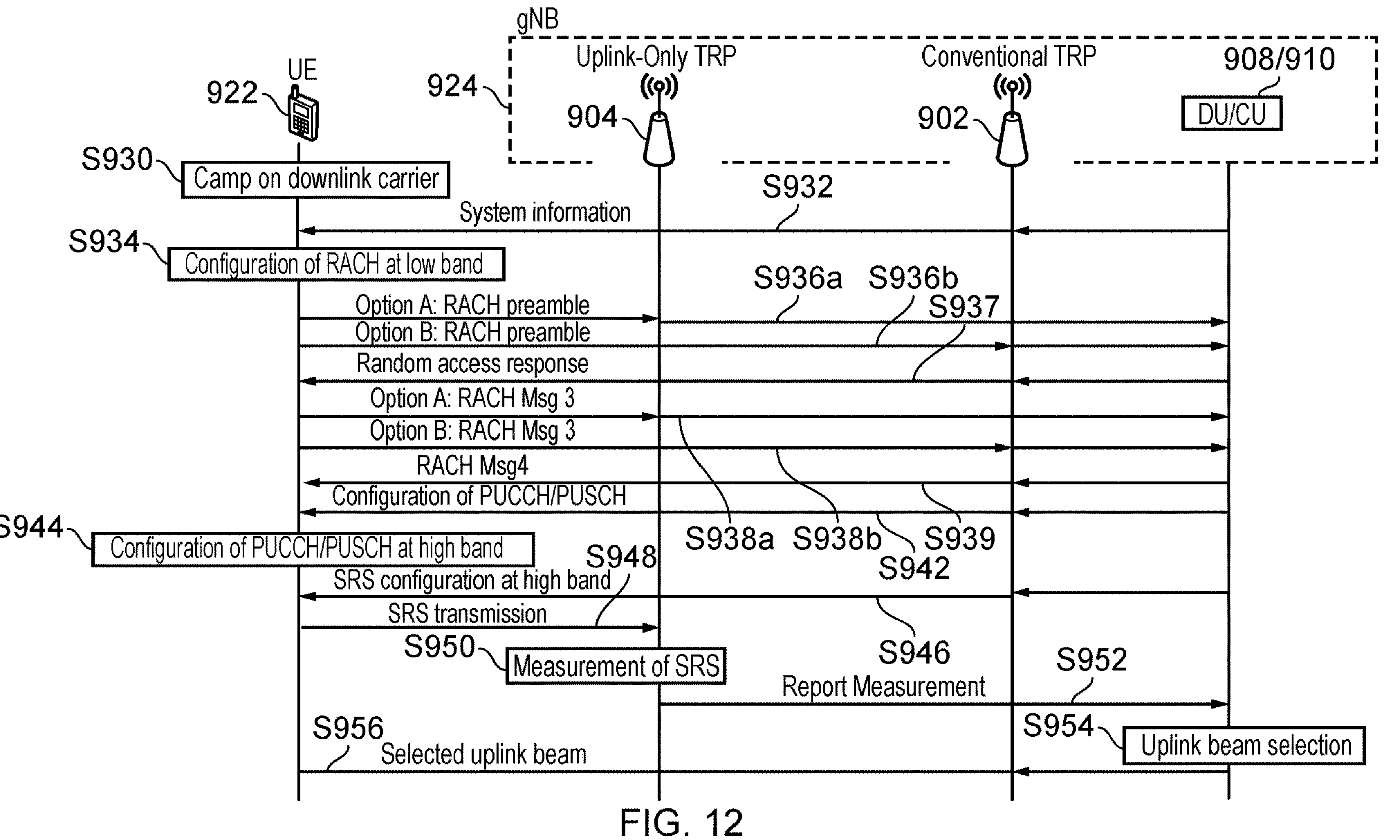
FIG. 12 schematically illustrates an initial beam establishment procedure according to example embodiments.

Furthermore, as will be appreciated by one skilled in the art, a combination of a TRP, DU and CU may be referred to as a "gNB", which may, in some arrangements, perform some or all of the functions of a TRP, DU and CU. Therefore, references to "gNB" should be construed as referring to an apparatus configured to perform some or all of the functions of a TRP, DU and/or CU. The gNB may be alternatively referred to as a "base station". In some embodiments, as shown in FIG. 12, a gNB 924 may comprise the CU 910, the DU 908, the conventional TRP 902 and the uplink only TRP 904.

In the context of FIG. 11, and the following Figures, the term "infrastructure equipment" should be construed as referring to one or more of the gNB 924, the conventional TRP 902, the uplink-only TRP, the DU 908 and the CU 910.

As mentioned previously, the terms "carrier" and "cell" are used interchangeably. As will be appreciated, a cell is the basis of cellular coverage. Each cell has unique cell ID which is broadcasted to communications devices in the downlink to enable the communications devices to distinguish between different cells. In conventional cellular systems, one or more antennas were located near a base station. For a homogeneous network, a base station may have three sectors (different direction antennas), each sector having unique cell ID. Currently, antenna location may be different than the base station location because of fronthaul. For a heterogeneous network, a TRP is the point of transmission or reception of radio which may or may not send a unique cell ID.

An "operating band" is defined in 3GPP spec and one or more than one carrier may be deployed in an a given operating band. Frequency range is defined for wider range of operating bands (e.g., FR2 for mmWave). Each TRP may send/receive one or more carriers.

In accordance with example embodiments, the conventional TRP 902 may have both transmission and reception capabilities. The uplink-only TRP 904 may either only have uplink capabilities or it has uplink and downlink capabilities but the downlink capabilities are deactivated. Therefore, from the perspective of the communications device, the uplink-only TRP 904 is a reception point only.

In some embodiments, the conventional TRP 902 (e.g., Macro cell) and uplink only TRP 904 (e.g., small cell) use carriers with different frequencies to avoid downlink interference or time division resource allocation with the same carrier frequency. In other embodiments, the conventional TRP 902 and the uplink only TRP 904 use carriers with the same frequency because the uplink only TRP 904 does not increase the downlink interference to neighbours. This has the technical advantage that the location of uplink-only TRPs have increased flexibility compared to conventional small cells which would contribute to downlink interference. As a result, the uplink reception point (uplink only TRP 904) could be deployed anywhere.

Initial Beam Establishment

An example method of performing initial beam establishment in accordance with example embodiments is described with reference to FIG. 12.

The method starts in step S930. In step S930, the communications device 922 camps on the conventional carrier provided by the conventional TRP 902. As will be appreciated by one skilled in the art, "camping" on a carrier may be alternatively stated as camping on a cell. In other words, the communications device 922 camps on a cell provided by the conventional TRP 902. After camping on the conventional carrier, the communications device 922 is ready to receive downlink transmissions from the conventional TRP 902.

Next, in step S932, the communications device 922 receives system information (SI) from the gNB 924. In particular, the system information is forwarded from the DU and/or CU 908/910 to the conventional TRP 902 and transmitted to the communications device 922 on the conventional carrier. The system information may include a configuration for transmitting an uplink access signal. In some embodiments, the system information includes a first configuration for transmitting an uplink access signal to the uplink-only TRP 904. The first configuration may indicate to the communications device 922 to transmit the uplink access signal to the uplink-only TRP 904 according to a low frequency band. The first configuration may indicate to the communications device 922 to transmit the uplink access signal to the uplink-only TRP 904 without beamforming. In some embodiments, the system information may include a second configuration for transmitting the uplink access signal to the conventional TRP 902. The second configuration may indicate to the communications device 922 to transmit the uplink access signal according to a high frequency band or a low band frequency. In some embodiments, the second configuration may indicate to the communications device 922 to transmit the uplink access signal to the conventional TRP 902 via a plurality of directional uplink beams. In some embodiments, the system information includes the second configuration instead of the first configuration. In some embodiments, the uplink access signal is a RACH preamble to be used by the communications device 922 for performing a RACH procedure (for example, a 2 step or a 4 step RACH procedure as will be appreciated by one skilled in the art). A low band frequency may be on the order of "MHz", for example, 800 MHz. As will be appreciated, the transmission of the RACH preamble on a low band frequency means that the RACH preamble is transmitted with reduced pathloss. A high band frequency may be on the order of GHz. For example, a high band frequency may be sub 6 GHz (for example, 3 GHz) or in the mmWaveband (for example, 28 GHz).

Next, in step S934, the communications device 922 configures the uplink access signal for transmission in accordance with the first or second configuration. In some embodiments, the uplink access signal is configured to be transmitted according to the low frequency band. For example, the communications device 922 may configure a RACH preamble to be transmitted in accordance with the low band frequency. Therefore, in embodiments where the communications device 922 configures the uplink access signal based on the first configuration, the communications device 922 prepares to transmit the uplink access signal on the uplink-only carrier to the uplink-only TRP 904 in accordance with the indicated low band frequency. By transmitting the uplink access signal on the uplink-only carrier according to the low band frequency, there is a high likelihood that the gNB 924 (or, in particular, the uplink-only TRP 904) will successfully receive the uplink access signal on the uplink-only carrier frequency. Therefore, the uplink access signal can be transmitted without beamforming and the likelihood of the gNB 924 (or the uplink-only TRP 904) remains high. Furthermore, the low band frequency means that a bandwidth of the uplink-only carrier is low which, as will be appreciated, lowers its capacity for carrying data. However, given that uplink access signals such as RACH preambles typically have a low amount of data, lower frequencies can be used for their transmission. Alternatively, in embodiments where the communications device 922 configures the uplink access signal based on the second configuration, the communications device 922 prepares to transmit the uplink access signal to the conventional TRP 902 in accordance with the indicated low band frequency (or, in some cases, with the indicated high band frequency). In some embodiments, the communications device 922 may prepare to transmit the uplink access signal to the conventional TRP 902 via a plurality of directional uplink beams.

In embodiments where the communications device 922 configures the uplink access signal according to the first configuration, the method proceeds to step S936*a* instead of step S936*b*. In step S936*a*, the communications device 922 transmits the uplink access signal to the gNB 924 on the uplink-only carrier in accordance with the indicated low band frequency. Specifically, the communications device 922 transmits the RACH preamble to the uplink-only TRP 924. In embodiments where the uplink-only TRP is located at a different site than the DU/CU 908, 910 then the uplink only TRP 904 forwards an indication to the DU 908 and/or CU 910 via the fronthaul link 926 indicating that the uplink access signal was received. Alternatively, in embodiments where the communications device 922 configures the uplink access signal according to the second configuration, the method proceeds to step S936*b* instead of step S936*a*. In step S936*b*, the communications device 922 transmits the uplink access signal to the conventional TRP 902 in accordance with the indicated low band or high band frequency. Then, the conventional TRP 902 forwards an indication to the DU 908 and/or CU 910 via the fronthaul link 926 indicating that the uplink access signal was received.

Next, in step S937, the gNB 924 transmits a random-access response (RAR) to the communications device 922 on the conventional carrier. In particular, the DU 908 and/or CU 910 forwards the RAR to the conventional TRP 902 and the conventional TRP 902 transmits the RAR to the communications device 922 on the conventional carrier.

As mentioned above, a 2 step or a 4 step RACH procedure may be used to provide initial access for the communications device 922. In embodiments where a 4 step RACH procedure is used, the method proceeds either to step S938*a* or step S938*b*. If a 2 step RACH procedure is used, the method proceeds to step S942.

In embodiments where a 4 step RACH procedure is used, the first configuration may indicate to the communications device to transmit RACH msg3 to the uplink-only TRP 904 according to a low band frequency without beamforming. Step S938*a* illustrates the transmission of RACH msg3 to the uplink-only TRP 904 according to a low band frequency without beamforming. RACH msg3 may be transmitted via a PUSCH transmission. The uplink-only TRP 904 forwards an indication of the received RACH msg3 to the DU and/or CU 908, 910.

Alternatively, in embodiments where a 4 step RACH procedure is used, the second configuration may indicate to the communications device 922 to transmit RACH msg3 according to a high or low band frequency with or without using beamforming. Step S938*b* illustrates the transmission of RACH msg3 to the conventional TRP 902 according to a low or high band frequency with or without beamforming. RACH msg3 may be transmitted via a PUSCH transmission. The conventional TRP 902 forwards an indication of the received RACH msg3 to the DU and/or CU 908, 910.

In embodiments where a 4 step RACH procedure is used, the method proceeds to step S939 following step S938*a* or S938*b*. In step S939, the gNB 924 transmits RACH Msg4 to the communications device on the conventional carrier. In particular, the DU/CU 908, 910 may forward RACH msg4 to the conventional TRP 902 for transmission to the communications device 922. RACH msg 4 may be transmitted via a PDSCH transmission. Next in steps S942 and S944, the gNB 924 transmits a physical uplink shared channel (PUSCH) and/or a physical uplink control channel (PUCCH) configuration to the communications device 922 on the conventional carrier. In particular, the DU 908 and/or CU 910 forwards the PUSCH and/or PUCCH configuration to the conventional TRP 902 and the conventional TRP 902 transmits the PUSCH and/or PUCCH configuration to the communications device 922 on the conventional carrier.

The PUSCH and/or PUCCH configuration may include parameters for the communications device 922 to configure a PUCH and/or PUCCH to be transmitted on the uplink-only carrier in accordance with a high band frequency. A high band frequency may be on the order of GHz. For example, a high band frequency may be sub 6 GHz (for example, 3 GHz) or in the mm Waveband (for example, 28 GHz). As will be appreciated, the use of a high band frequency means that that capacity of the uplink-only carrier for carrying data is increased. Since PUSCH and/or PUCCH typically contain a larger amount of data than a RACH preamble (which is transmitted using the low band). Therefore, the use of a high band frequency enables PUSCH and/or PUCCH to be transmitted. In step S944, the communications device 922 configures the PUSCH and/or PUCCH according to the configuration received in step S942.

Next, in step S946, the gNB 924 transmits an indication of uplink resources to the communications device 922 on the conventional carrier for the communications device 922. The uplink resources are for uplink transmissions on the uplink-only carrier. In particular, the DU 908 and/or CU 910 forwards the indication of uplink resources to the conventional TRP 902 and the conventional TRP 902 transmits the indication of uplink resources to the communications device 922 on the conventional carrier. The indication of the uplink resources may include an indication to use a high band frequency for uplink transmissions in the indicated uplink resources. In some embodiments, the indication of uplink resources may comprise an indication of an SRS configuration in the indicated uplink resources. The indication of the SRS configuration may identify a plurality of SRSs in the uplink resources to be transmitted. The indication of the SRS configuration may specifically identify that the plurality of SRSs are to be transmitted in accordance with a high band frequency.

Next, in step S948, the communications device 922 transmits, to the gNB 924, a plurality of directional uplink beams on the uplink-only carrier in accordance with the uplink resources indicated by the gNB 924 on the conventional carrier. In some embodiments, the communications device 922 transmits an SRS on each of the plurality of directional uplink beams on the uplink-only carrier in accordance with the high band frequency indicated by the indicated SRS configuration. In some embodiments, the plurality of directional uplink beams are transmitted to the uplink-only TRP 904. The plurality of directional uplink beams may be transmitted at different transmission timings and in different spatial directions.

Next in step S948, the gNB 924 performs measurements on the plurality of directional uplink beams. For example, the gNB 924 may perform measurements on the SRS in each of the plurality of directional uplink beams. In some embodiments, the measurements may comprise measurements of a received signal strength of the SRS in each of the plurality of directional uplink beams. In some embodiments, the measurements are performed by the uplink-only TRP 904.

Next, in step S952, the measurements performed by the uplink only TRP 904 are forwarded to the DU 908 and/or CU 910 on the fronthaul link 926.

Next, in step S954, the gNB 924 selects one of the plurality of directional uplink beams based on the measurements. For example, the DU 908 and/or CU 910 may select one of the plurality of directional uplink beams based on the measurements received from the uplink-only TRP 904. In some embodiments, the directional uplink beam with the highest measured received signal strength is selected.

In step S956, the gNB 924 indicates the selected one of the plurality of directional uplink beams to the communications device 922 on the conventional carrier. For example, the DU 908 and/or CU 910 may forward an indication of the selected directional uplink beam to the conventional TRP 902 and the conventional TRP 902 transmits an indication of the selected directional uplink beam to the communications device 922 on the conventional carrier.

The use of a low band frequency for transmitting the RACH preamble on the uplink-only carrier means that the gNB 924/uplink-only TRP 904 has a high likelihood of successfully receiving the RACH preamble despite not being transmitted via beamforming. This is because, as explained above, the use of a low band frequency means the pathloss is low. This means that the communications device 922 can successfully perform an RACH access procedure with the gNB 924 without having to perform beamforming. The use of a high band frequency for transmitting the plurality of directional uplink beams on the uplink-only carrier means that the uplink-only carrier can have sufficient bandwidth to transmit the plurality of directional uplink beams. As explained above, the transmission of the plurality of directional uplink beams allows one of the beams to be selected. Therefore the method described with respect to FIG. 12 provides an efficient beamforming initial establishment procedure in an asymmetric coverage scenario and, particularly, in scenarios where channel reciprocity cannot be assumed.

Beam Adjustment

In accordance with example embodiments, the gNB 924 may determine that a beam adjustment procedure is required. Then, in accordance with example embodiments, the gNB 924 transmits an indication of uplink resources to the communications device 922 on the conventional carrier for the communications device 922. The uplink resources are for uplink transmissions on the uplink-only carrier. In particular, the DU 908 and/or CU 910 forwards the indication of uplink resources to the conventional TRP 902 and the conventional TRP 902 transmits the indication of uplink resources to the communications device 922 on the conventional carrier. In some embodiments, the indication of uplink resources may comprise an indication of an SRS configuration in the indicated uplink resources. The indication of the SRS configuration may identify a plurality of SRSs in the uplink resources to be transmitted.

The communications device 922 transmits, to the gNB 924, a plurality of directional uplink beams on the uplink-only carrier in accordance with the uplink resources indicated by the gNB 924 on the conventional carrier. In some embodiments, the communications device 922 transmits an SRS on each of the plurality of directional uplink beams on the uplink-only carrier in accordance with the indicated SRS configuration. In some embodiments, the plurality of directional uplink beams are transmitted to the uplink-only TRP 904.

The above-described beam adjustment procedure allows a communications device to separately execute uplink beam pair adjustment and downlink beam pair adjustment. In other words, the communications device 922 does not rely on beam correspondence even if it is capable to operate in accordance with beam correspondence. Therefore, the communications device 922 can efficiently perform a beam adjustment procedure for uplink beam-pair adjustment even in asymmetric coverage scenarios.

Beam Failure Detection and Beam Recovery

Figure 13:
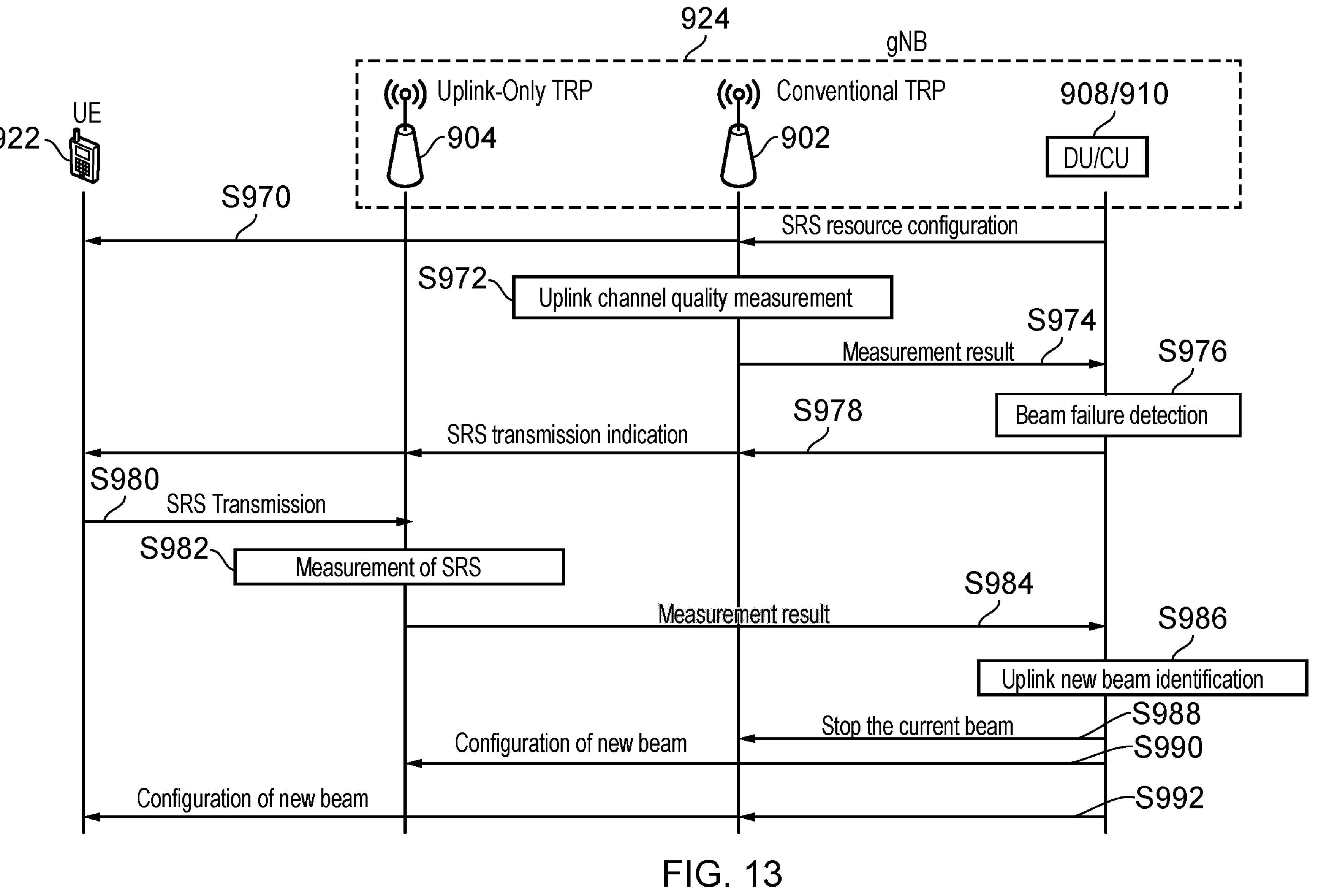
FIG. 13 schematically illustrates a beam failure detection and recovery procedure according to example embodiments.

Embodiments can provide a beam failure detection and recovery procedure as shown in FIG. 13 for example. The method starts in step S970. In step S970, the gNB 924 transmits an indication of uplink resources to the communications device 922 on the conventional carrier. The uplink resources are for uplink transmissions on the uplink-only carrier. In particular, the DU 908 and/or CU 910 may forward the indication of uplink resources to the conventional TRP 902 and the conventional TRP 902 transmits the indication of uplink resources to the communications device 922 on the conventional carrier. In some embodiments, the indication of uplink resources may comprise an indication of an SRS configuration in the indicated uplink resources. The indication of the SRS configuration may identify a plurality of SRSs in the uplink resources to be transmitted.

Next, in step S972, the gNB 924 measures an uplink channel quality of a directional uplink beam received by the gNB 924. If the conventional carrier is bi-directional, then the directional uplink beam is received by the gNB 924 on the conventional carrier. If the conventional carrier is not bi-directional, then the directional uplink beam is received by the gNB 924 on another conventional carrier provided by the gNB 924 for uplink transmissions. In some embodiments, the communications device 922 transmits the directional uplink beam to the conventional TRP 902. For example, when the conventional TRP 902 operates according to a TDD mode of operation, the communications device 922 transmits the directional uplink beam to the conventional TRP 902 on the bi-directional conventional carrier. Alternatively, when the conventional TRP 902 operates according to an FDD mode of operation, the communications device 922 transmits the directional uplink beam to the conventional TRP 902 on another conventional carrier provided by the conventional TRP 902 for uplink transmissions.

In some embodiments, the conventional TRP 902 measures the uplink channel quality of the directional uplink beam. The measurements may be based one or more uplink signals received from the communications device 922 on the directional uplink beam. The measurements of the one or more uplink signals may be based on measurements of demodulation reference signals (DM-RS) of a PUSCH or PUCCH received on the directional uplink beam, a block error rate (BLER) of a PUSCH received on the directional uplink beam, a received signal strength of an SRS received on the directional uplink beam or a pathloss determined from the received directional uplink beam. As will be appreciated by one skilled in the art, other methods of measuring the uplink channel quality are possible.

Next, in step S974, the conventional TRP 902 forwards the measurements of the uplink channel quality to the DU 908 and/or CU 910.

Next, in step S976, the gNB 924 detects uplink beam failure based on the received measurements of the uplink channel quality.

Next, in step S978, the gNB 924 transmits a transmission indication to the communications device 922 indicating to the communications device 922 to transmit the plurality directional uplink beams in accordance with the uplink resources indicated by the gNB 924 (in step S970). In some embodiments, the DU 908 and/or CU 910 forwards the transmission indication to the conventional TRP 902 and the conventional TRP 902 transmits the transmission indication to the communications device 922. In embodiments where the indication of uplink resources comprises an indication of an SRS configuration in the indicated uplink resources, the transmission indication is an indication to transmit an SRS on each of the plurality of directional uplink beams on the uplink-only carrier.

Next, in step S980, in response to receiving the transmission indication from the gNB 924, the communications device 922 transmits, to the gNB 924, the plurality of directional uplink beams on the uplink-only carrier in accordance with the uplink resources indicated by the gNB 924 on the conventional carrier. In some embodiments, the communications device 922 transmits an SRS on each of the plurality of directional uplink beams on the uplink-only carrier in accordance with the indicated SRS configuration. In some embodiments, the plurality of directional uplink beams are transmitted to the uplink-only TRP 904.

Next, in step S982, the gNB 924 performs measurements on the plurality of directional uplink beams transmitted by the communications device 922 on the uplink-only carrier. For example, the gNB 924 may perform measurements on each SRS in each of the plurality of directional uplink beams. In one example, the gNB 924 measures a received signal strength of each SRS in each of the plurality of directional uplink beams. In some embodiments, the measurements are performed by the uplink-only TRP 904.

Next, in step S984, the measurements performed on the plurality of directional uplink beams are forwarded to the DU 908 and/or CU 910 via the fronthaul link 926.

Next, in step S986, the gNB 924 selects one of the plurality of directional uplink beams based on the measurements performed on the plurality of directional uplink beams. For example, the gNB 924 may select the directional uplink beam with the SRS which has the highest measured received signal strength. In some embodiments, the gNB 924 may determine whether the received signal strength of any of the directional uplink beams are above a pre-defined threshold. In cases where multiple directional uplink beams are above the pre-defined threshold, the gNB 924 may select the directional uplink beam with the highest received signal strength. In cases where the received signal strength of all of the directional uplink beams is below the pre-defined threshold, the gNB 924 may not select a beam. In some embodiments, the gNB 924 may determine that beam failure has occurred. For example, the gNB 924 may determine that beam failure has occurred if a directional uplink beam has not been selected after a pre-defined number of consecutive measurements or after a pre-defined time period. In such cases, the gNB 924 may transmit a failure indication to the communications device 922. In response, the communications device 922 may initiate a RACH procedure. In some embodiments, the selection of one of the plurality of directional uplink beams is performed by the DU 908 and/or CU 910.

Next, in step S988, the gNB 924 stops receiving the directional uplink beam transmitted by the communications device 922. In some embodiments, the DU 908 and/or CU 910 may forward an indication to the conventional TRP 902 indicating to the conventional TRP to stop receiving the directional uplink beam transmitted by the communications device 922.

Next, in step S990, the gNB 924 configures the selected one of the plurality of directional uplink beams received from the communications device 922 on the uplink-only carrier. In some embodiments, the DU 908 and/or CU 910 configures the selected directional uplink beam and forwards an indication of the configuration to the uplink-only TRP 904. The configuration of the selected directional uplink beam may include configuring the uplink reception beam (spatial filter) in the beam pair for the selected directional uplink beam.

Next, in step S992, the gNB 924 transmits an indication of the configuration of the selected directional uplink beam to the communications device 922. For example, the gNB 924 may transmit an SRS ID of the selected directional uplink beam. In some embodiments, the DU 908 and/or CU 910 forwards the indication of the configuration to the conventional TRP 902 and the conventional TRP 902 transmits the indication of the configuration to the communications device 922 on the conventional carrier. After receiving the indication of the selected directional uplink beam, the communications device 922 may configure the uplink transmission beam (spatial filter) in the beam pair for the selected directional uplink beam.

As described above, the transmission of the indication of uplink resources (in step S970) may occur before the detection of uplink beam failure (in step S976). In this way, the communications device 922 is already prepared to transmit the plurality of directional uplink beams (in step S980) in response to receiving the transmission indication (in step S978).

The beam failure detection and recovery procedure, which has been described with reference to FIG. 13, allows the communications device 922 to perform uplink beam pair failure detection and recovery separately from downlink beam pair failure detection and recovery. In other words, the communications device 922 does not rely on beam correspondence even if it is capable to operate in accordance with beam correspondence. Therefore, the communications device 922 can efficiently beam failure detection and recovery procedure even in asymmetric coverage scenarios.

As explained above, embodiments can provide methods, communications devices and infrastructure equipment for providing an uplink beam pair without relying on channel reciprocity/beam correspondence. Therefore, uplink transmissions can be performed via beamforming even in asymmetric coverage scenarios. Accordingly, a dense deployment of communications devices in asymmetric coverage scenarios is possible to improve uplink coverage. Embodiments allow beamforming to for uplink communications in such scenarios which can lead to reduced maximum communications device transmission power (since the communications device only needs to transmit in the direction of the selected directional uplink beam) and a reduction in uplink interference between different communications devices (because the uplink transmissions from each communications device is directional in accordance with the selected directional uplink beam). Therefore, embodiments can provide for improved communications efficiency in wireless communications networks and, in particular, in efficiently providing improved uplink coverage.

Those skilled in the art would appreciate that the method shown by FIG. 11 may be adapted in accordance with embodiments of the present technique. For example, other intermediate steps may be included in this method, or the steps may be performed in any logical order. Though embodiments of the present technique have been described largely by way of the example communications system shown in FIG. 11, and described with respect to the operation examples defined by FIGS. 11 and 12, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for transmitting signals to and/or receiving signals from infrastructure equipment of a wireless communications network, the method comprising

- receiving, from the infrastructure equipment on a first carrier for the communications device, an indication of uplink resources for transmitting a plurality of directional uplink beams to the infrastructure equipment on a second carrier for the communications device, the second carrier being an uplink-only carrier,
- transmitting the plurality of directional uplink beams to the infrastructure equipment on the second carrier in accordance with the uplink resources indicated by the infrastructure equipment, and
- receiving, from the infrastructure equipment on the first carrier, an indication of a result of measurements performed on the plurality of directional uplink beams transmitted on the second carrier.

Paragraph 2. A method according to paragraph 1, wherein the indication of the uplink resources for transmitting the plurality of directional uplink beams on the second carrier comprises

- an indication of a sounding reference signal, SRS, configuration in the indicated uplink resources, the indication of the SRS configuration identifying a plurality of SRSs to be transmitted in the indicated uplink resources, and wherein
- the transmitting the plurality of directional uplink beams on the second carrier in accordance with the indicated uplink resources comprises transmitting the plurality of SRSs on the plurality of directional uplink beams in accordance with the SRS configuration in the indicated uplink resources.

Paragraph 3. A method according to paragraph 1 or paragraph 2, comprising receiving, from the infrastructure equipment on the first carrier, an indication to transmit an uplink access signal according to a specified frequency, and, in response, configuring the second carrier to be transmitted in accordance with the specified frequency, and transmitting the uplink access signal to the infrastructure equipment on the second carrier configured in accordance with the specified frequency.

Paragraph 4. A method according to paragraph 3, wherein the uplink access signal is a random access channel, RACH, preamble.

Paragraph 5. A method according to paragraph 3 or paragraph 4, wherein the specified frequency is a low band frequency and the indication of the uplink resources for transmitting the plurality of directional uplink beams on the second carrier comprises an indication to transmit the plurality of directional uplink beams according to a high band frequency, the high band frequency being higher than the low band frequency, wherein the transmitting the plurality of directional uplink beams in accordance with the indicated uplink resources comprises configuring the second carrier to be transmitted in accordance with the high band frequency, and transmitting the plurality of directional uplink beams to the infrastructure equipment on the second carrier configured in accordance with the high band frequency.

Paragraph 6. A method according to any of paragraphs 1 to 5, wherein the receiving the indication of the result of measurements performed on the plurality of directional uplink beams comprises receiving an indication of a selected one of the plurality of directional uplink beams based on the measurements.

Paragraph 7. A method according to paragraph 6, comprising receiving, from the infrastructure equipment on the first carrier, another indication of uplink resources for transmitting the plurality of directional uplink beams to the infrastructure equipment on the second carrier, transmitting the plurality of directional uplink beams to the infrastructure equipment on the second carrier in accordance with the uplink resources indicated by the other indication, and receiving, from the infrastructure equipment on the first carrier, an indication of another selected one of the plurality of directional uplink beams transmitted on the second carrier.

Paragraph 8. A method according to any of paragraphs 1 to 7, comprising receiving, from the infrastructure equipment on the first carrier, a transmission indication comprising an indication to transmit the plurality directional uplink beams in accordance with the indicated uplink resources, wherein the transmitting the plurality of directional uplink beams on the second carrier in accordance with the indicated uplink resources comprises transmitting the plurality of directional uplink beams on the second carrier in accordance with the indicated uplink resources in response to the transmission indication.

Paragraph 9. A method according to any of paragraphs 1 to 8, wherein the receiving the indication of the result of measurements performed on the plurality of directional uplink beams comprises receiving a failure indication indicating that one of the plurality of directional uplink beams could not be selected based on the measurements.

Paragraph 10. A method according to any of paragraphs 1 to 9, wherein a frequency of the first carrier is different than a frequency of the second carrier.

Paragraph 11. A method according to any of paragraphs 1 to 10, wherein the receptions from the infrastructure equipment on the first carrier are received from a first antenna port of the infrastructure equipment and the transmissions to the infrastructure equipment on the second carrier are transmitted to a second antenna port of the infrastructure equipment.

Paragraph 12. A method according to paragraph 11, wherein a quasi-location, QCL, of the first antenna port is the same as a QCL of the second antenna port.

Paragraph 13. A method according to paragraph 11, wherein the first antenna port and the second antenna port are located at physically different locations.

Paragraph 14. A method according paragraph 13, wherein the first antenna port is a first transmission and reception point, TRP, of the infrastructure equipment and the second antenna port is a second TRP of the infrastructure equipment, wherein the first TRP and the second TRP are connected to the same distributed unit, DU, of the infrastructure equipment.

Paragraph 15. A method according to paragraph 14, wherein the second carrier is a supplementary uplink carrier.

Paragraph 16. A method according to paragraph 11, wherein first carrier and the second carrier are aggregated in carrier aggregation, the first carrier being a primary component carrier and the second carrier being a second component carrier, the first antenna port and the second antenna port being connected to the same central unit, CU, of the infrastructure equipment.

Paragraph 17. A method according to paragraph 16, wherein the first antenna port is belongs to a Master Cell Group, MCG, and the second antenna port belongs to a Secondary Cell Group, SCG.

Paragraph 18. A method according to paragraph 11, wherein the first antenna port and the second antenna port are connected by a backhaul link.

Paragraph 19. A method according to any of paragraphs 1 to 18, wherein an uplink-only coverage area provided by the second carrier covers a smaller geographical area than a downlink coverage area provided by the first carrier.

Paragraph 20. A method of operating infrastructure equipment of a wireless communications network for transmitting signals to and/or receiving signals from a communications device, the method comprising transmitting, to the communications device on a first carrier for the communications device, an indication of uplink resources for transmitting a plurality of directional uplink beams to the infrastructure equipment on a second carrier for the communications device, the second carrier being an uplink-only carrier, receiving the plurality of directional uplink beams from the communications device on the second carrier in accordance with the uplink resources indicated by the infrastructure equipment, performing one or more measurements on the plurality of directional uplink beams, and transmitting, to the communications device on the first carrier, an indication of a result of the measurements to the communications device.

Paragraph 21. A method according to paragraph 20, wherein the indication of the uplink resources for transmitting the plurality of directional uplink beams on the second carrier comprises an indication of a sounding reference signal, SRS, configuration in the indicated uplink resources, the indication of the SRS configuration identifying a plurality of SRSs to be transmitted in the indicated uplink resources, and wherein the receiving the plurality of directional uplink beams on the second carrier in accordance with the indicated uplink resources comprises receiving the plurality of SRSs on the plurality of directional uplink beams in accordance with the SRS configuration in the indicated uplink resources.

Paragraph 22. A method according to paragraph 20 or paragraph 21, comprising transmitting, to the communications device on the first carrier, an indication to transmit an uplink access signal according to a specified frequency, and, receiving the uplink access signal from the communications device on the second carrier in accordance with the specified frequency.

Paragraph 23. A method according to paragraph 22, wherein the uplink access signal is a random access channel, RACH, preamble.

Paragraph 24. A method according to paragraph 22 or paragraph 23, wherein the specified frequency is a low band frequency and the indication of the uplink resources for transmitting the plurality of directional uplink beams on the second carrier comprises an indication to transmit the plurality of directional uplink beams according to a high band frequency, the high band frequency being higher than the low band frequency, wherein the receiving the plurality of directional uplink beams in accordance with the indicated uplink resources comprises receiving the plurality of directional uplink beams from the communications device on the second carrier in accordance with the high band frequency.

Paragraph 25. A method according to any of paragraphs 20 to 24, wherein the transmitting the indication of the result of measurements performed on the plurality of directional uplink beams comprises selecting one of the plurality of directional uplink beams based on the measurements, and transmitting an indication of the selected directional uplink beam to the communications device on the first carrier.

Paragraph 26. A method according to a paragraph 25, wherein the performing one or more measurements on the plurality of directional uplink beams comprises measuring a received signal strength of the plurality of directional uplink beams, and selecting one of the plurality of directional uplink beams based on the measured received signal strength of each of the plurality of directional uplink beams.

Paragraph 27. A method according to paragraph 25 or paragraph 26, comprising transmitting, to the communications device on the first carrier, another indication of uplink resources for transmitting the plurality of directional uplink beams to the infrastructure equipment on the second carrier, receiving the plurality of directional uplink beams from the communications device on the second carrier in accordance with the uplink resources indicated by the other indication, and transmitting, to the communications device on the first carrier, an indication of another selected one of the plurality of directional uplink beams transmitted on the second carrier.

Paragraph 28. A method according to any of paragraphs 20 to 27, comprising transmitting, to the communications device on the first carrier, a transmission indication comprising an indication to transmit the plurality directional uplink beams in accordance with the indicated uplink resources, wherein the receiving the plurality of directional uplink beams on the second carrier in accordance with the indicated uplink resources comprises receiving the plurality of directional uplink beams on the second carrier in accordance with the indicated uplink resources in response to the transmission indication.

Paragraph 29. A method according to any of paragraphs 20 to 28, comprising determining, based on the measurements performed on the plurality of directional uplink beams, that one of the plurality of directional uplink beams could not be selected, wherein the transmitting the indication of the result of measurements performed on the plurality of directional uplink beams comprises transmitting a failure indication indicating that one of the plurality of directional uplink beams could not be selected based on the measurements.

Paragraph 30. A method according to paragraph 29, wherein the determining, based on the measurements performed on the plurality of directional uplink beams, that one of the plurality of directional uplink beams could not be selected comprises determining that a measured received signal strength for each of the plurality of directional uplink beams is below a pre-defined threshold.

Paragraph 31. A method according to any of paragraphs 20 to 30, wherein a frequency of the first carrier is different than a frequency of the second carrier.

Paragraph 32. A method according to any of paragraphs 20 to 31, wherein the transmissions from the infrastructure equipment on the first carrier are transmitted by a first antenna port of the infrastructure equipment and the receptions from the infrastructure equipment on the second carrier are received from a second antenna port of the infrastructure equipment.

Paragraph 33. A method according to paragraph 32, wherein a quasi-location, QCL, of the first antenna port is the same as a QCL of the second antenna port.

Paragraph 34. A method according to paragraph 32, wherein the first antenna port and the second antenna port are located at physically different locations.

Paragraph 35. A method according paragraph 34, wherein the first antenna port is a first transmission and reception point, TRP, of the infrastructure equipment and the second antenna port is a second TRP of the infrastructure equipment, wherein the first TRP and the second TRP are connected to the same distributed unit, DU, of the infrastructure equipment.

Paragraph 36. A method according to paragraph 35, wherein the second carrier is a supplementary uplink carrier.

Paragraph 37. A method according to paragraph 32, wherein first carrier and the second carrier are aggregated in carrier aggregation, the first carrier being a primary component carrier and the second carrier being a second component carrier, the first antenna port and the second antenna port being connected to the same central unit, CU, of the infrastructure equipment.

Paragraph 38. A method according to paragraph 37, wherein the first antenna port is belongs to a Master Cell Group, MCG, and the second antenna port belongs to a Secondary Cell Group, SCG.

Paragraph 39. A method according to paragraph 32, wherein the first antenna port and the second antenna port are connected by a backhaul link.

Paragraph 40. A method according to any of paragraphs 20 to 39, wherein an uplink-only coverage area provided by the second carrier covers a smaller geographical area than a downlink coverage area provided by the first carrier.

Paragraph 41. A communications device operable to transmit signals to and/or receive signals from infrastructure equipment of a wireless communications network, the communications device comprising a transmitter configured to transmit signals;

a receiver configured to receive signals; and a controller configured in combination with the transmitter and the receiver to receive, from the infrastructure equipment on a first carrier for the communications device, an indication of uplink resources for transmitting a plurality of directional uplink beams to the infrastructure equipment on a second carrier for the communications device, the second carrier being an uplink-only carrier, transmit the plurality of directional uplink beams to the infrastructure equipment on the second carrier in accordance with the uplink resources indicated by the infrastructure equipment, and receive, from the infrastructure equipment on the first carrier, an indication of a result of measurements performed on the plurality of directional uplink beams transmitted on the second carrier.

Paragraph 42. A communications device according to paragraph 41, wherein the indication of the uplink resources for transmitting the plurality of directional uplink beams on the second carrier comprises an indication of a sounding reference signal, SRS, configuration in the indicated uplink resources, the indication of the SRS configuration identifying a plurality of SRSs to be transmitted in the indicated uplink resources, and wherein the controller is configured in combination with the transmitter to transmit the plurality of SRSs on the plurality of directional uplink beams in accordance with the SRS configuration in the indicated uplink resources.

Paragraph 43. A communications device according to paragraph 41 or paragraph 42, wherein the controller is configured in combination with the transmitter and the receiver to receive, from the infrastructure equipment on the first carrier, an indication to transmit an uplink access signal according to a specified frequency, and, in response, configure the second carrier to be transmitted in accordance with the specified frequency, and transmit the uplink access signal to the infrastructure equipment on the second carrier configured in accordance with the specified frequency.

Paragraph 44. A communications device according to paragraph 43, wherein the uplink access signal is a random access channel, RACH, preamble.

Paragraph 45. A communications device according to paragraph 43 or paragraph 44, wherein the specified frequency is a low band frequency and the indication of the uplink resources for transmitting the plurality of directional uplink beams on the second carrier comprises an indication to transmit the plurality of directional uplink beams according to a high band frequency, the high band frequency being higher than the low band frequency, wherein the controller is configured in combination with the transmitter to configure the second carrier to be transmitted in accordance with the high band frequency, and transmit the plurality of directional uplink beams to the infrastructure equipment on the second carrier configured in accordance with the high band frequency.

Paragraph 46. A communications device according to any of paragraphs 41 to 45, wherein the controller is configured in combination with the receiver to receive an indication of a selected one of the plurality of directional uplink beams based on the measurements.

Paragraph 47. A communications device according to paragraph 46, wherein the controller is configured in combination with the transmitter and the receiver to receive, from the infrastructure equipment on the first carrier, another indication of uplink resources for transmitting the plurality of directional uplink beams to the infrastructure equipment on the second carrier, transmit the plurality of directional uplink beams to the infrastructure equipment on the second carrier in accordance with the uplink resources indicated by the other indication, and receive, from the infrastructure equipment on the first carrier, an indication of another selected one of the plurality of directional uplink beams transmitted on the second carrier.

Paragraph 48. A communications device according to any of paragraphs 41 to 47, wherein the controller is configured in combination with the transmitter and the receiver to receive, from the infrastructure equipment on the first carrier, a transmission indication comprising an indication to transmit the plurality directional uplink beams in accordance with the indicated uplink resources, and transmit the plurality of directional uplink beams on the second carrier in accordance with the indicated uplink resources in response to the transmission indication.

Paragraph 49. A communications device according to any of paragraphs 41 to 48, wherein the controller is configured in combination with the receiver to receive a failure indication indicating that one of the plurality of directional uplink beams could not be selected based on the measurements.

Paragraph 50. A communications device according to any of paragraphs 41 to 49, wherein a frequency of the first carrier is different than a frequency of the second carrier.

Paragraph 51. A communications device according to any of paragraphs 41 to 50, wherein the receptions from the infrastructure equipment on the first carrier are received from a first antenna port of the infrastructure equipment and the transmissions to the infrastructure equipment on the second carrier are transmitted to a second antenna port of the infrastructure equipment.

Paragraph 52. A communications device according to paragraph 51, wherein a quasi-location, QCL, of the first antenna port is the same as a QCL of the second antenna port.

Paragraph 53. A communications device according to paragraph 51, wherein the first antenna port and the second antenna port are located at physically different locations.

Paragraph 54. A communications device according paragraph 53, wherein the first antenna port is a first transmission and reception point, TRP, of the infrastructure equipment and the second antenna port is a second TRP of the infrastructure equipment, wherein the first TRP and the second TRP are connected to the same distributed unit, DU, of the infrastructure equipment.

Paragraph 55. A communications device according to paragraph 54, wherein the second carrier is a supplementary uplink carrier.

Paragraph 56. A communications device according to paragraph 51, wherein first carrier and the second carrier are aggregated in carrier aggregation, the first carrier being a primary component carrier and the second carrier being a second component carrier, the first antenna port and the second antenna port being connected to the same central unit, CU, of the infrastructure equipment.

Paragraph 57. A communications device according to paragraph 56, wherein the first antenna port is belongs to a Master Cell Group, MCG, and the second antenna port belongs to a Secondary Cell Group, SCG.

Paragraph 58. A communications device according to paragraph 51, wherein the first antenna port and the second antenna port are connected by a backhaul link.

Paragraph 59. A communications device according to any of paragraphs 41 to 58, wherein an uplink-only coverage area provided by the second carrier covers a smaller geographical area than a downlink coverage area provided by the first carrier.

Paragraph 60. Infrastructure equipment of a wireless communications network operable to transmit signals to and/or receive signals from a communications device, the infrastructure equipment comprising a transmitter configured to transmit signals;

a receiver configured to receive signals; and a controller configured in combination with the transmitter and the receiver to transmit, to the communications device on a first carrier for the communications device, an indication of uplink resources for transmitting a plurality of directional uplink beams to the infrastructure equipment on a second carrier for the communications device, the second carrier being an uplink-only carrier, receive the plurality of directional uplink beams from the communications device on the second carrier in accordance with the uplink resources indicated by the infrastructure equipment, perform one or more measurements on the plurality of directional uplink beams, and transmit, to the communications device on the first carrier, an indication of a result of the measurements to the communications device.

Paragraph 61. Infrastructure equipment according to paragraph 60, wherein the indication of the uplink resources for transmitting the plurality of directional uplink beams on the second carrier comprises an indication of a sounding reference signal, SRS, configuration in the indicated uplink resources, the indication of the SRS configuration identifying a plurality of SRSs to be transmitted in the indicated uplink resources, and wherein the controller is configured in combination with the receiver to receive the plurality of SRSs on the plurality of directional uplink beams in accordance with the SRS configuration in the indicated uplink resources.

Paragraph 62. Infrastructure equipment according to paragraph 60 or paragraph 61, wherein the controller is configured in combination with the transmitter and the receiver to transmit, to the communications device on the first carrier, an indication to transmit an uplink access signal according to a specified frequency, and, receive the uplink access signal from the communications device on the second carrier in accordance with the specified frequency.

Paragraph 63. Infrastructure equipment according to paragraph 62, wherein the uplink access signal is a random access channel, RACH, preamble.

Paragraph 64. Infrastructure equipment according to paragraph 62 or paragraph 63, wherein the specified frequency is a low band frequency and the indication of the uplink resources for transmitting the plurality of directional uplink beams on the second carrier comprises an indication to transmit the plurality of directional uplink beams according to a high band frequency, the high band frequency being higher than the low band frequency, wherein the controller is configured in combination with the receiver to receive the plurality of directional uplink beams from the communications device on the second carrier in accordance with the high band frequency.

Paragraph 65. Infrastructure equipment according to any of paragraphs 60 to 64, wherein the controller is configured in combination with the transmitter to select one of the plurality of directional uplink beams based on the measurements, and transmit an indication of the selected directional uplink beam to the communications device on the first carrier.

Paragraph 66. Infrastructure equipment according to a paragraph 65, wherein the controller is configured to measure a received signal strength of the plurality of directional uplink beams, and select one of the plurality of directional uplink beams based on the measured received signal strength of each of the plurality of directional uplink beams.

Paragraph 67. Infrastructure equipment according to paragraph 65 or paragraph 66, wherein the controller is configured in combination with the transmitter and the receiver to transmit, to the communications device on the first carrier, another indication of uplink resources for transmitting the plurality of directional uplink beams to the infrastructure equipment on the second carrier, receive the plurality of directional uplink beams from the communications device on the second carrier in accordance with the uplink resources indicated by the other indication, and transmit, to the communications device on the first carrier, an indication of another selected one of the plurality of directional uplink beams transmitted on the second carrier.

Paragraph 68. Infrastructure equipment according to any of paragraphs 60 to 67, wherein the controller is configured in combination with the transmitter and the receiver to transmit, to the communications device on the first carrier, a transmission indication comprising an indication to transmit the plurality directional uplink beams in accordance with the indicated uplink resources, and receive the plurality of directional uplink beams on the second carrier in accordance with the indicated uplink resources in response to the transmission indication.

Paragraph 69. Infrastructure equipment according to any of paragraphs 60 to 68, wherein the controller is configured in combination with the transmitter to determine, based on the measurements performed on the plurality of directional uplink beams, that one of the plurality of directional uplink beams could not be selected, and transmit a failure indication indicating that one of the plurality of directional uplink beams could not be selected based on the measurements.

Paragraph 70. Infrastructure equipment according to paragraph 69, wherein the controller is configured to determine that a measured received signal strength for each of the plurality of directional uplink beams is below a pre-defined threshold.

Paragraph 71. Infrastructure equipment according to any of paragraphs 60 to 70, wherein a frequency of the first carrier is different than a frequency of the second carrier.

Paragraph 72. Infrastructure equipment according to any of paragraphs 60 to 71, wherein the infrastructure equipment comprises a first antenna port; and a second antenna port, wherein the transmissions from the infrastructure equipment on the first carrier are transmitted by the first antenna port of the infrastructure equipment and the receptions from the infrastructure equipment on the second carrier are received from the second antenna port of the infrastructure equipment.

Paragraph 73. Infrastructure equipment according to paragraph 72, wherein a quasi-location, QCL, of the first antenna port is the same as a QCL of the second antenna port.

Paragraph 74. Infrastructure equipment according to paragraph 72, wherein the first antenna port and the second antenna port are located at physically different locations.

Paragraph 75. Infrastructure equipment according paragraph 74, wherein the infrastructure equipment comprises a distributed unit, DU, wherein the first antenna port is a first transmission and reception point, TRP, of the infrastructure equipment and the second antenna port is a second TRP of the infrastructure equipment, and the first TRP and the second TRP are connected to the DU of the infrastructure equipment.

Paragraph 76. Infrastructure equipment according to paragraph 75, wherein the second carrier is a supplementary uplink carrier.

Paragraph 77. Infrastructure equipment according to paragraph 72, wherein the infrastructure equipment comprises a central unit, wherein the first carrier and the second carrier are aggregated in carrier aggregation, the first carrier being a primary component carrier and the second carrier being a second component carrier, the first antenna port and the second antenna port being connected to the CU of the infrastructure equipment.

Paragraph 78. Infrastructure equipment according to paragraph 77, wherein the first antenna port is belongs to a Master Cell Group, MCG, and the second antenna port belongs to a Secondary Cell Group, SCG.

Paragraph 79. Infrastructure equipment according to any of paragraphs 70 to 78, wherein an uplink-only coverage area provided by the second carrier covers a smaller geographical area than a downlink coverage area provided by the first carrier.

Paragraph 80. Infrastructure equipment according to paragraph 72, wherein the first antenna port and the second antenna port are connected by a backhaul link.

Paragraph 81. Circuitry for a communications device operable to transmit signals to and/or receive signals from infrastructure equipment of a wireless communications network, the circuitry comprising a transmitter configured to transmit signals;

a receiver configured to receive signals; and a controller configured in combination with the transmitter and the receiver to receive, from the infrastructure equipment on a first carrier for the communications device, an indication of uplink resources for transmitting a plurality of directional uplink beams to the infrastructure equipment on a second carrier for the communications device, the second carrier being an uplink-only carrier, transmit the plurality of directional uplink beams to the infrastructure equipment on the second carrier in accordance with the uplink resources indicated by the infrastructure equipment, and receive, from the infrastructure equipment on the first carrier, an indication of a result of measurements performed on the plurality of directional uplink beams transmitted on the second carrier.

Paragraph 82. Circuitry for infrastructure equipment of a wireless communications network operable to transmit signals to and/or receive signals from a communications device, the circuitry comprising a transmitter configured to transmit signals;

a receiver configured to receive signals; and a controller configured in combination with the transmitter and the receiver to transmit, to the communications device on a first carrier for the communications device, an indication of uplink resources for transmitting a plurality of directional uplink beams to the infrastructure equipment on a second carrier for the communications device, the second carrier being an uplink-only carrier, receive the plurality of directional uplink beams from the communications device on the second carrier in accordance with the uplink resources indicated by the infrastructure equipment, perform one or more measurements on the plurality of directional uplink beams, and transmit, to the communications device on the first carrier, an indication of a result of the measurements to the communications device.

Paragraph 83. A wireless communications system comprising a communications device according to paragraph 41 and infrastructure equipment according to paragraph 60.

Paragraph 84. A computer program comprising instructions which, when loaded onto a computer, cause the computer to perform a method according to any of paragraphs 1 to 40.

Paragraph 85. A non-transitory computer-readable storage medium storing a computer program according to paragraph 84.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed, the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-212702, "New WID on NR UL Enhancements".

[3] 3GPP TS 38.101-1, "NR; User Equipment (UE) radio transmission and reception; Part 1: Range 1 Standalone".

[4] 3GPP TS 38.101-2 V15.13.0 (2021-03), "NR; User Equipment (UE) radio transmission and reception; Part 1: Range 1 Standalone".

What is claimed is:

1. A method of operating a communications device for transmitting signals to and/or receiving signals from infrastructure equipment of a wireless communications network, the method comprising receiving, from the infrastructure equipment on a first carrier for the communications device, an indication of uplink resources for transmitting a plurality of directional uplink beams to the infrastructure equipment on a second carrier for the communications device, the second carrier being an uplink-only carrier, transmitting the plurality of directional uplink beams to the infrastructure equipment on the second carrier in accordance with the uplink resources indicated by the infrastructure equipment, and receiving, from the infrastructure equipment on the first carrier, an indication of a result of measurements performed on the plurality of directional uplink beams transmitted on the second carrier.

2. A method according to claim 1, wherein the indication of the uplink resources for transmitting the plurality of directional uplink beams on the second carrier comprises an indication of a sounding reference signal, SRS, configuration in the indicated uplink resources, the indication of the SRS configuration identifying a plurality of SRSs to be transmitted in the indicated uplink resources, and wherein the transmitting the plurality of directional uplink beams on the second carrier in accordance with the indicated uplink resources comprises transmitting the plurality of SRSs on the plurality of directional uplink beams in accordance with the SRS configuration in the indicated uplink resources.

3. A method according to claim 1, comprising receiving, from the infrastructure equipment on the first carrier, an indication to transmit an uplink access signal according to a specified frequency, and, in response, configuring the second carrier to be transmitted in accordance with the specified frequency, and transmitting the uplink access signal to the infrastructure equipment on the second carrier configured in accordance with the specified frequency.

4. A method according to claim 3, wherein the uplink access signal is a random access channel, RACH, preamble.

5. A method according to claim 3, wherein the specified frequency is a low band frequency and the indication of the uplink resources for transmitting the plurality of directional uplink beams on the second carrier comprises an indication to transmit the plurality of directional uplink beams according to a high band frequency, the high band frequency being higher than the low band frequency, wherein the transmitting the plurality of directional uplink beams in accordance with the indicated uplink resources comprises configuring the second carrier to be transmitted in accordance with the high band frequency, and transmitting the plurality of directional uplink beams to the infrastructure equipment on the second carrier configured in accordance with the high band frequency.

6. A method according to claim 1, wherein the receiving the indication of the result of measurements performed on the plurality of directional uplink beams comprises receiving an indication of a selected one of the plurality of directional uplink beams based on the measurements.

7. A method according to claim 6, comprising receiving, from the infrastructure equipment on the first carrier, another indication of uplink resources for transmitting the plurality of directional uplink beams to the infrastructure equipment on the second carrier, transmitting the plurality of directional uplink beams to the infrastructure equipment on the second carrier in accordance with the uplink resources indicated by the other indication, and receiving, from the infrastructure equipment on the first carrier, an indication of another selected one of the plurality of directional uplink beams transmitted on the second carrier.

8. A method according to claim 1, comprising receiving, from the infrastructure equipment on the first carrier, a transmission indication comprising an indication to transmit the plurality directional uplink beams in accordance with the indicated uplink resources, wherein the transmitting the plurality of directional uplink beams on the second carrier in accordance with the indicated uplink resources comprises transmitting the plurality of directional uplink beams on the second carrier in accordance with the indicated uplink resources in response to the transmission indication.

9. A method according to claim 1, wherein the receiving the indication of the result of measurements performed on the plurality of directional uplink beams comprises receiving a failure indication indicating that one of the plurality of directional uplink beams could not be selected based on the measurements.

10. A method according to claim 1, wherein a frequency of the first carrier is different than a frequency of the second carrier.

11. A method according to claim 1, wherein the receptions from the infrastructure equipment on the first carrier are received from a first antenna port of the infrastructure equipment and the transmissions to the infrastructure equipment on the second carrier are transmitted to a second antenna port of the infrastructure equipment.

12. A communications device operable to transmit signals to and/or receive signals from infrastructure equipment of a wireless communications network, the communications device comprising a transmitter configured to transmit signals;

a receiver configured to receive signals; and a controller configured in combination with the transmitter and the receiver to receive, from the infrastructure equipment on a first carrier for the communications device, an indication of uplink resources for transmitting a plurality of directional uplink beams to the infrastructure equipment on a second carrier for the communications device, the second carrier being an uplink-only carrier, transmit the plurality of directional uplink beams to the infrastructure equipment on the second carrier in accordance with the uplink resources indicated by the infrastructure equipment, and receive, from the infrastructure equipment on the first carrier, an indication of a result of measurements performed on the plurality of directional uplink beams transmitted on the second carrier.

13. A communications device according to claim 12, wherein the indication of the uplink resources for transmitting the plurality of directional uplink beams on the second carrier comprises an indication of a sounding reference signal, SRS, configuration in the indicated uplink resources, the indication of the SRS configuration identifying a plurality of SRSs to be transmitted in the indicated uplink resources, and wherein the controller is configured in combination with the transmitter to transmit the plurality of SRSs on the plurality of directional uplink beams in accordance with the SRS configuration in the indicated uplink resources.

14. A communications device according to claim 12, wherein the controller is configured in combination with the transmitter and the receiver to receive, from the infrastructure equipment on the first carrier, an indication to transmit an uplink access signal according to a specified frequency, and, in response, configure the second carrier to be transmitted in accordance with the specified frequency, and transmit the uplink access signal to the infrastructure equipment on the second carrier configured in accordance with the specified frequency.

15. A communications device according to claim 12, wherein the controller is configured in combination with the receiver to receive an indication of a selected one of the plurality of directional uplink beams based on the measurements.

16. A communications device according to claim 12, wherein an uplink-only coverage area provided by the second carrier covers a smaller geographical area than a downlink coverage area provided by the first carrier.

17. Infrastructure equipment of a wireless communications network operable to transmit signals to and/or receive signals from a communications device, the infrastructure equipment comprising a transmitter configured to transmit signals;

a receiver configured to receive signals; and a controller configured in combination with the transmitter and the receiver to transmit, to the communications device on a first carrier for the communications device, an indication of uplink resources for transmitting a plurality of directional uplink beams to the infrastructure equipment on a second carrier for the communications device, the second carrier being an uplink-only carrier, receive the plurality of directional uplink beams from the communications device on the second carrier in accordance with the uplink resources indicated by the infrastructure equipment, perform one or more measurements on the plurality of directional uplink beams, and transmit, to the communications device on the first carrier, an indication of a result of the measurements to the communications device.

18. Infrastructure equipment according to claim 17, wherein the indication of the uplink resources for transmitting the plurality of directional uplink beams on the second carrier comprises an indication of a sounding reference signal, SRS, configuration in the indicated uplink resources, the indication of the SRS configuration identifying a plurality of SRSs to be transmitted in the indicated uplink resources, and wherein the controller is configured in combination with the receiver to receive the plurality of SRSs on the plurality of directional uplink beams in accordance with the SRS configuration in the indicated uplink resources.

19. Infrastructure equipment according to claim 17, wherein the controller is configured in combination with the transmitter and the receiver to transmit, to the communications device on the first carrier, an indication to transmit an uplink access signal according to a specified frequency, and, receive the uplink access signal from the communications device on the second carrier in accordance with the specified frequency.

20. Infrastructure equipment according to claim 17, wherein the controller is configured in combination with the transmitter to select one of the plurality of directional uplink beams based on the measurements, and transmit an indication of the selected directional uplink beam to the communications device on the first carrier.

* * * * *